(12) United States Patent
Jung

(10) Patent No.: US 10,887,124 B2
(45) Date of Patent: Jan. 5, 2021

(54) ELECTRONIC DEVICE AND METHOD FOR CONTROLLING THEREOF

(71) Applicant: Samsung Electronics Co., Ltd., Suwon-si (KR)

(72) Inventor: Ra-mi Jung, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 16/039,780

(22) Filed: Jul. 19, 2018

(65) Prior Publication Data

US 2019/0081810 A1    Mar. 14, 2019

(30) Foreign Application Priority Data

Sep. 13, 2017  (KR) .................. 10-2017-0116990

(51) Int. Cl.
*G10L 15/32*    (2013.01)
*H04L 12/28*    (2006.01)
(Continued)

(52) U.S. Cl.
CPC ............ *H04L 12/282* (2013.01); *G06F 3/167* (2013.01); *G10L 15/30* (2013.01); *H04L 12/2827* (2013.01); *G10L 15/22* (2013.01)

(58) Field of Classification Search
CPC ....... G10L 15/00; G10L 15/065; G10L 15/08; G10L 15/20; G10L 15/22; G10L 15/32;
(Continued)

(56) References Cited

U.S. PATENT DOCUMENTS

| 7,050,971 B1 | 5/2006 | Kaufholz |
| 7,720,679 B2 | 5/2010 | Ichikawa et al. |

(Continued)

FOREIGN PATENT DOCUMENTS

| EP | 3 171 549 A1 | 5/2017 |
| KR | 10-2009-0076718 A | 7/2009 |

(Continued)

OTHER PUBLICATIONS

International Search Report dated Nov. 13, 2018, issued in International Application No. PCT/KR2018/008840.

(Continued)

*Primary Examiner* — Qi Han
(74) *Attorney, Agent, or Firm* — Jefferson IP Law, LLP

(57) ABSTRACT

An electronic device and a controlling method are provided. The controlling method of the electronic device includes transmitting a signal to a plurality of external devices communicatively connected to the electronic device, receiving, from each of the plurality of external devices, intensity information of the signal sensed by an external device and identification information of an external device, determining at least one external device that is positioned in a same space as the electronic device, from among the plurality of external devices, based on the response signal, designating the at least one external device and the electronic device as a device group, and controlling the device group based on the user command, when a user command is input to at least one device from among the device groups.

20 Claims, 25 Drawing Sheets

(51) Int. Cl.
*G06F 3/16* (2006.01)
*G10L 15/30* (2013.01)
*G10L 15/22* (2006.01)

(58) Field of Classification Search
CPC ........... G10L 2015/00; G10L 2015/223; G10L 2015/225; G10L 2015/228
USPC ............. 704/275, 270, 270.1, 234, 236, 246
See application file for complete search history.

(56) References Cited

U.S. PATENT DOCUMENTS

| | | | |
|---|---|---|---|
| 9,749,583 B1* | 8/2017 | Fineberg | ............... H04N 7/147 |
| 9,930,519 B2 | 3/2018 | Kim et al. | |
| 2008/0181172 A1 | 7/2008 | Angelhag et al. | |
| 2015/0106086 A1 | 4/2015 | Oh et al. | |
| 2015/0140990 A1 | 5/2015 | Kim et al. | |
| 2015/0163609 A1 | 6/2015 | Mahasenan et al. | |
| 2015/0312113 A1* | 10/2015 | Forutanpour | ........... H04L 67/10 715/734 |
| 2015/0340040 A1 | 11/2015 | Mun et al. | |
| 2016/0179462 A1 | 6/2016 | Bjorkengren | |
| 2017/0105095 A1 | 4/2017 | Um et al. | |
| 2017/0142538 A1* | 5/2017 | Chen | ................... H04L 12/2803 |
| 2017/0206896 A1 | 7/2017 | Ko et al. | |
| 2017/0242651 A1 | 8/2017 | Lang et al. | |
| 2018/0367959 A1* | 12/2018 | Heikkinen | ........... H04W 76/40 |

FOREIGN PATENT DOCUMENTS

| | | |
|---|---|---|
| KR | 10-1072709 B1 | 10/2011 |
| KR | 10-2013-0105889 A | 9/2013 |
| KR | 10-2015-0059081 A | 5/2015 |
| WO | 2012/092141 A1 | 7/2012 |

OTHER PUBLICATIONS

Extended European Search Report dated Apr. 1, 2020, issued in European Patent Application No. 18856651.7.
European Office Action dated Oct. 29, 2020, issued in European Patent Application No. 18856651.7-1203.

* cited by examiner

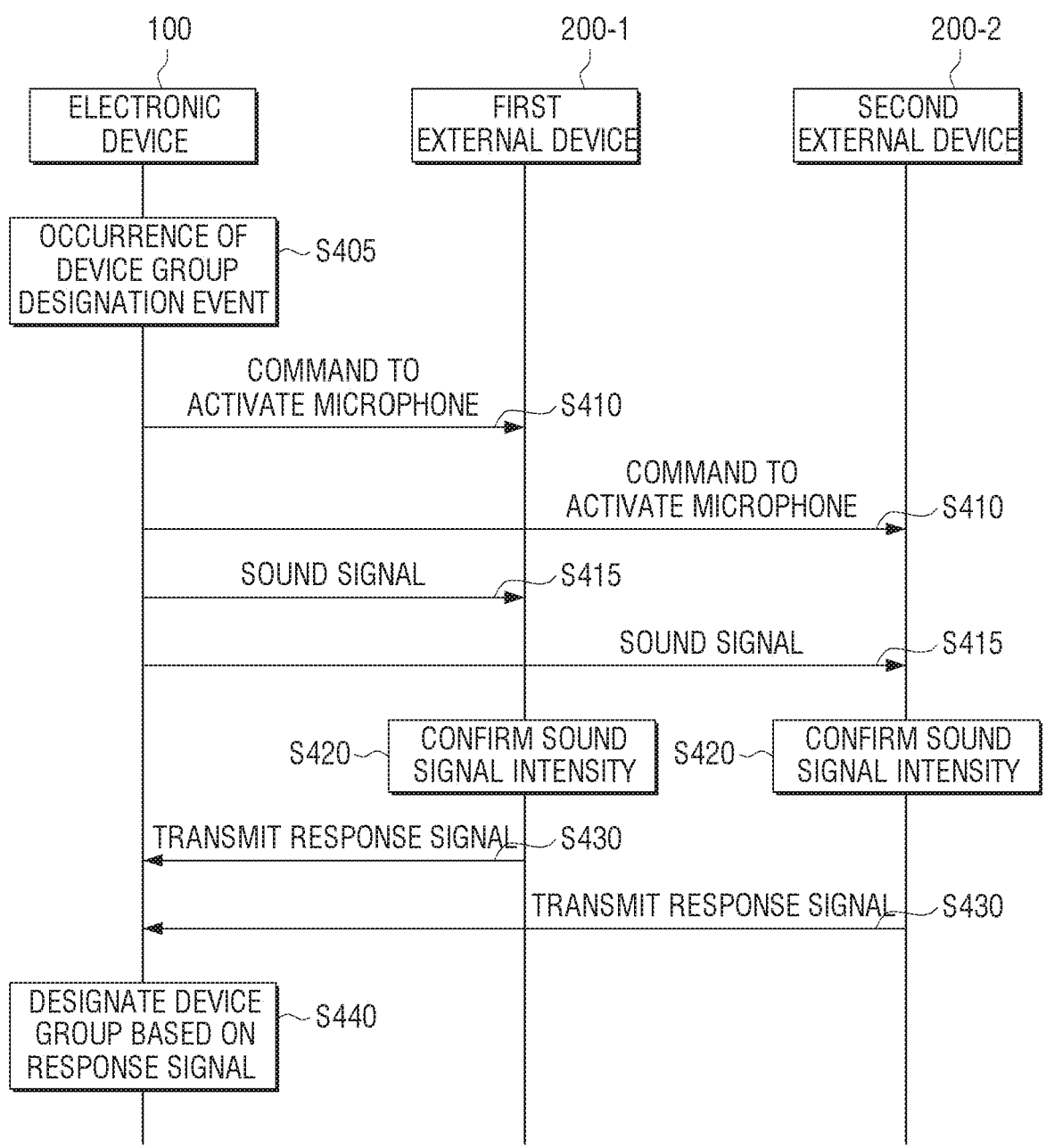

ELECTRONIC DEVICE AND METHOD FOR CONTROLLING THEREOF

CROSS-REFERENCE TO RELATED APPLICATION(S)

This application is based on and claims priority under 35 U.S.C. § 119(a) of a Korean patent application number 10-2017-0116990, filed on Sep. 13, 2017 in the Korean Intellectual Property Office, the disclosure of which is incorporated by reference herein in its entirety.

BACKGROUND

1. Field

The disclosure relates generally to an electronic device for designating a device group and a controlling method. More particularly, the disclosure relates to an electronic device for designating a device group including at least one electronic device based on a response signal with respect to a signal transmitted to an external electronic device and a controlling method thereof.

2. Description of Related Art

The development of semiconductor technology and wireless communication technology which includes communication functions is leading to convenient control of objects by forming a network. As described above, including a communication function and connecting via network is called internet of things (IoT), which is widely used in real life.

Even if there are a plurality of IoT devices in a house, it is necessary to divide a plurality of devices in a separated space and interlock with each other based on a space due to restriction of communication. For example, there is a need to assign a plurality of IoT devices located in a house to an IoT device existing in a living room, an IoT device existing in a main room, and an IoT device existing in a kitchen, and so on, designate device groups, and control the designated device groups.

The above information is presented as background information only to assist with an understanding of the disclosure. No determination has been made, and no assertion is made, as to whether any of the above might be applicable as prior art with regard to the disclosure SUMMARY Aspects of the disclosure are to address at least the above-mentioned problems and/or disadvantages and to provide at least the advantages described below. Accordingly, an aspect of the disclosure is to provide an electronic device which is capable of designating a device group based on information of intensity of a signal included in a response signal of an external device in response to a signal of an electronic device, and controlling the designated device group, and a controlling method thereof.

Additional aspects will be set forth in part in the description which follows and, in part, will be apparent from the description, or may be learned by practice of the presented embodiments.

In accordance with an aspect of the disclosure, a controlling method of an electronic device is provided. The method includes transmitting a signal to a plurality of external devices communicatively connected to the electronic device, receiving, from each of the plurality of external devices, intensity information of the signal sensed by an external device and identification information of an external device, determining at least one external device that is positioned in a same space as the electronic device, from among the plurality of external devices, based on the response signal, designating the at least one external device and the electronic device as a device group, and controlling the device group based on the user command, when a user command is input to at least one device from among the device groups.

In accordance with an aspect of the disclosure, an electronic device is provided. The electronic device includes a communication interface configured to communicate with an external device, and at least one processor configured to transmit a signal to a plurality of external devices communicatively connected to the electronic device, receive, from each of the plurality of external devices, intensity information of the signal sensed by an external device and identification information of an external device; determine at least one external device that is positioned in a same space as the electronic device, from among the plurality of external devices, based on the response signal, designate the at least one external device and the electronic device as a device group, and generate a control signal to control the device group based on the user command, when a user command is input to at least one device from among the device groups.

According to various embodiments of the present disclosure as described above, by designating a device group based on a plurality of spaces, a user can more effectively control devices in a house.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a sequence drawing for describing an embodiment for designating a device group using a sound signal by an electronic device according to an embodiment of the disclosure;

Throughout the drawings, like reference numerals will be understood to refer to like parts, components, and structures.

DETAILED DESCRIPTION

Figure 1:
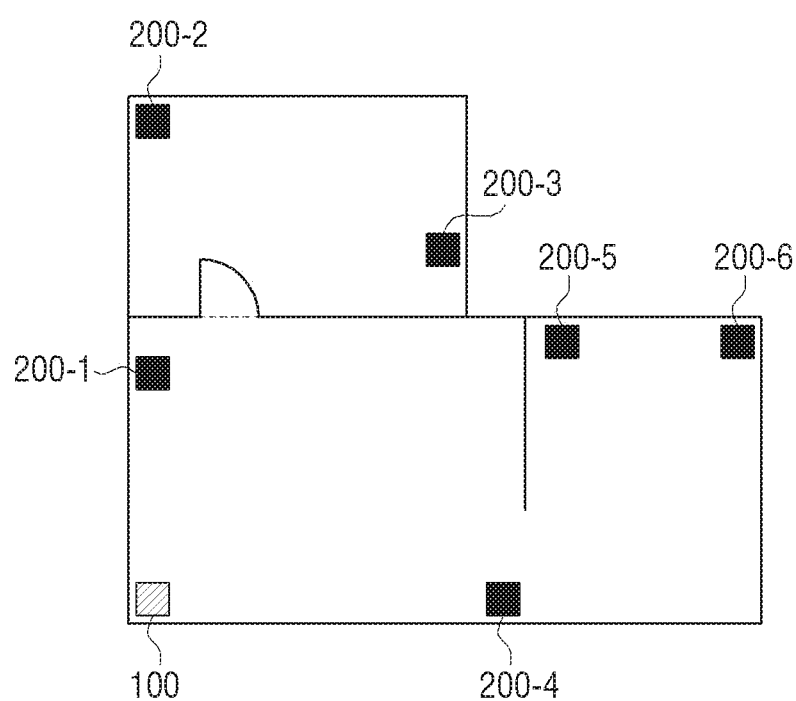
FIG. 1 is a diagram illustrating an electronic device and a system including the external device according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this document, the expressions "have," "may have," "including," or "may include" may be used to denote the presence of a feature (e.g., a numerical value, a function, an operation), and does not exclude the presence of additional features.

It is to be understood that the singular forms "a," "an," and "the" include plural referents unless the context clearly dictates otherwise. Thus, for example, reference to "a component surface" includes reference to one or more of such surfaces.

The terms such as "first," "second," and so on may be used to describe a variety of elements, but the elements should not be limited by these terms. The terms are used only for the purpose of distinguishing one element from another.

It is to be understood that a component (e.g., a first component) is "operatively or communicatively coupled with/to" another component (e.g., a second component) is that any such element may be directly connected to the other element or may be connected via another element (e.g., a third element). On the other hand, when it is mentioned that an element (e.g., a first element) is "directly connected" or "directly accessed" to another element (e.g., a second element), it can be understood that there is no other component (e.g., a third component) between the other components.

Herein, the expression "configured to" can be used interchangeably with, for example, "suitable for", "having the capacity to", "designed to", "adapted to", "made to", or "capable of". The expression "configured to" does not necessarily mean "specifically designed to" in a hardware sense. Instead, under some circumstances, "a device configured to" may indicate that such a device can perform an operation along with another device or part. For example, the expression "a processor configured to perform A, B, and C" may indicate an exclusive processor (e.g., an embedded processor) to perform the corresponding operation, or a generic-purpose processor (e.g., a central processing unit (CPU) or application processor (AP)) that can perform the corresponding operations by executing one or more software programs stored in the memory device An electronic device and an external device in accordance with various embodiments of the disclosure may include at least one of, for example, smartphones, tablet PCs, mobile phones, video telephones, electronic book readers, desktop PCs, laptop PCs, netbook computers, workstations, servers, a personal digital assistant (PDA), a portable multimedia player (PMP), an MP3 player, a medical device, a camera, or a wearable device. A wearable device may include at least one of the accessory type (e.g., as a watch, a ring, a bracelet, a bracelet, a necklace, a pair of glasses, a contact lens or a head-mounted-device (HMD)); a fabric or a garment-embedded type (e.g., a skin pad or a tattoo); or a bio-implantable circuit. In some embodiments, the electronic device may be a television, a digital versatile disc (DVD) player, audio, refrigerator, cleaner, ovens, microwaves, washing machines, air purifiers, set top boxes, home automation control panels, security control panels, media box (e.g., Samsung HomeSync™, Apple TV™, or Google TV™), game consoles (e.g., Xbox™, PlayStation™), electronic dictionary, electronic key, camcorder, or electronic frame.

In other embodiments, the electronic device and the external device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), navigation system, global navigation satellite system (GNSS), event data recorder (EDR), flight data recorder (FDR), automotive infotainment devices, marine electronic equipment (e.g., marine navigation devices, gyro compasses, etc.), avionics, security devices, car head units, industrial or domestic robots, drone, ATMs, points of sale of stores, or IoT devices (e.g., light bulbs, sensors, sprinkler devices, fire alarms, thermostats, street lights, toasters, exercise equipment, hot water tanks, heater, boiler, etc.)

An electronic device 100 and an external device 200 according to embodiments of the disclosure may operate in a standby mode or a normal mode. The standby mode is a mode for activating only a part of the configurations (e.g., a sub-processor, a microphone, and the like) to receive a triggered voice for performing voice recognition, and the normal mode is a mode for controlling devices within a device group through recognition of voice after triggered voice is received.

Hereinafter, the disclosure will be described in more detail with reference to the drawings.

FIG. 1 is a diagram illustrating a system within a house including an electronic device and an external device, according to an embodiment of the disclosure.

Referring to FIG. 1, a system within a house includes an electronic device 100 and a plurality of external devices 200-1 to 200-6. At this time, the electronic device 100 may be located in the living room, and the plurality of external devices 200-1 to 200-6 may be located in various places in the house. The electronic device 100 may be implemented as a fixed electronic device, such as a smart television (TV), and the electronic device 100 may be implemented as a portable electronic device such as a robot cleaner.

The electronic device 100 may be communicatively coupled with a plurality of external devices 200-1 to 200-6. The electronic device 100 may receive and store information on the external device from the plurality of external devices 200-1 to 200-6. The electronic device 100 may store information on a plurality of external devices 200-1 to 200-6, such as identification information, whether or not a microphone is included, or whether or not trigger sound is recognized to a device table.

When an event for designating a device group occurs, the electronic device 100 may transmit a signal to the plurality of external devices 200-1 to 200-6. In this case, the event for designating a device group may be an event in which a user command for designating a device group is input, an event in which a new external device is added, an event that a predetermined cycle is near, an event that the electronic device 100 moves beyond a predetermined value, and the like. When a user command for designating a device group is inputted through the electronic device 100, the electronic device 100 may transmit a sound signal having a specific pattern frequency to a plurality of external devices. When information on a new external device is received in the electronic device 100, the electronic device 100 may transmit a sound signal having a specific pattern frequency to a plurality of external devices. Alternatively, the electronic device 100 may transmit a sound signal having a specific pattern frequency to a plurality of external apparatuses at predetermined intervals. When the electronic device 100 is movable, if the movement of the electronic device 100 is greater than or equal to a predetermined value, the electronic device 100 may transmit a sound signal having a particular pattern of frequencies to a plurality of external devices.

When the electronic device 100 includes a speaker, the electronic device 100 may transmit a sound signal to the plurality of external devices 200-1 to 200-6 through the speaker. The transmitted sound signal may have a specific frequency and waveform to identify the electronic device 100. The transmitted sound signal may be a sound signal having a frequency other than the audible frequency range so as not to interfere with the user's viewing of the contents. The signal according to an embodiment may be a sound signal output by a speaker, or may be a communication signal transmitted by another communication module (for example, a Bluetooth signal or a Wi-Fi signal).

The electronic device 100 may send a command to activate the microphones of the plurality of external devices 200-1 to 200-6 before the electronic device 100 transmits a sound signal. A plurality of external devices 200-1 to 200-6 can activate the microphone in response to a command to activate the microphone.

Each of the plurality of external devices 200-1 to 200-6 may acquire intensity information on a signal transmitted by the electronic device 100. When the signal transmitted by the electronic device 100 is a sound signal, the plurality of external devices 200-1 to 200-6 can acquire intensity information of the sound signal received through the microphone.

Each of the plurality of external devices 200-1 to 200-6 can generate a response signal including intensity information of the sound signal and identification information about the external device and transmit the generated response signal to the electronic device 100.

The electronic device 100 can designate a device group based on the response signal received from the plurality of external devices 200-1 to 200-6. The electronic device 100 may determine whether the intensity information for the sound signal among the response signals received from the plurality of external devices 200-1 to 200-6 is equal to or greater than a threshold value and determine at least one external device located in the same space as the electronic device 100, from among the plurality of external devices 200-1 to 200-6. The electronic device 100 may designate the external device and the electronic device 100 that have transmitted the intensity information of the threshold value or more as one device group. For example, when a response signal including intensity information of a threshold value or more is received from the first external device 200-1 and the fourth external device 200-4 located in the living room space, the electronic device 100 may designate the first external device 200-1 and the fourth external device 200-4 as one device group together with the electronic device 100.

When a plurality of external devices and the electronic device 100 are designated as one device group and a user command is input to at least one of the devices included in the device group, the electronic device 100 may control the device group according to a user command. Each of the electronic device 100 and the plurality of external devices may include a microphone for receiving user voice. In addition, one of the electronic device 100 and a plurality of external devices may activate some configuration of elements (such as a microphone and a processor) even in the standby mode to detect user triggered speech.

When a user has uttered a user voice including a triggered voice (e.g., "Hi, Galaxy"), an external device for detecting the triggered voice in the device group responds to the triggered voice included in the user voice, and the electronic device 100 may transmit a signal for activating the remaining devices to the remaining devices. When the electronic device 100 detects a triggered voice in the device group, the electronic device 100 activates another configuration of the electronic device 100 in response to the triggered voice, and may transmit a signal for activating the external devices 200 to an external device in the device group.

When the user speaks after the devices included in the device group are activated by the triggered voice, the electronic device 100 may receive the user's voice through the microphone, and the external device included in the device group may transmit information about one user's voice to the electronic device 100.

The electronic device 100 may perform voice recognition on the user's voice based on information on the user's voice directly received by the electronic device 100 and information on the user's voice received from the external devices.

The electronic device 100 may control devices within a device group based on the voice recognition result. An embodiment in which the electronic device 100 is controlled by user voice will be described in a further detail later.

Figure 2A:
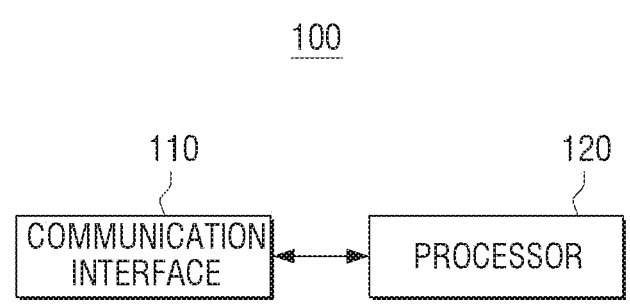
FIG. 2A is a block diagram briefly illustrating a configuration of an electronic device according to an embodiment of the disclosure.

FIG. 2A is a block diagram briefly illustrating the configuration of an electronic device according to an embodiment of the disclosure.

Referring to FIG. 2A, the electronic device includes a communication interface 110 and a processor 120.

The communication interface 110 may perform a communication connection with external devices. The communication interface 110 may receive information about an external device from each of the external devices. The communication interface may receive from each of the external devices identification information about the external device, whether or not the microphone is included, information on whether or not the triggered voice is recognized, location information of the external device, and the like.

The communication interface 110 may receive a response signal including the strength information of the signal received by the external device 200 from the external device 200 and the identification information of the external device. The communication interface 110 may transmit a control command to a device designated as a device group.

The processor 120 may transmit a signal to a plurality of external devices communicatively connected to the electronic device 100, receive a response signal including intensity information of a signal sensed by the external device and identification information of the external device from each of the plurality of external devices, and designate at least one external device and an electronic device from the plurality of external devices based on the response signal, by determining at least one external device located in the same space as the electronic device 100. The processor 120 may generate a control command for controlling at least one of the devices included in the device group according to a user command, and may transmit the generated command to a control target device via the communication interface 110.

The processor 120 may identify at least one external device having an intensity value of a signal included in the response signal among the plurality of external devices equal to or greater than a predetermined value, and designate the identified at least one external device and electronic device 100 located in the same space as the electronic device 100 as a device group. The term space refers to an area distinguished from other spaces by obstacles such as a wall, in which predetermined values can be defined according to the ratio at which intensity of the signal is reduced by an obstacle such as a wall.

The processor 120 may transmit a sound signal through a speaker and can receive a response signal including intensity information of a sound signal received through a microphone provided in an external apparatus from each of a plurality of external devices. Not only the intensity information of the sound signal, but also the identification information of the external device, the pattern information of the sound signal, and the like may be included in the response signal.

The processor 120 may designate a response signal having information of intensity that is greater than equal to a predetermined threshold value as a device group along with the electronic device 100.

When one of the devices included in the device group receives a triggered voice for performing the voice recognition function after the device group is designated, the processor 120 may control the communication interface 110 so as to transmit a trigger signal to activate a microphone to each of the devices included in a device group. When one of the external devices in the device group receives the triggered voice, the processor 120 may receive the information of the triggered voice from a device which receives a triggered voice through the communication interface 110, and control the communication interface 110 to transmit the trigger signal for activating the microphone to another device. Alternatively, when the electronic device 100 directly receives the triggered voice, the processor 120 may control the communication interface 110 to activate a microphone within a device and transmit a trigger signal for activating a microphone to external devices.

When a user voice is input through a microphone included in at least one external device after the device group is designated, the processor 120 may receive information about the user voice from at least one external device via the communication interface 110 and may perform voice recognition using information on the user's voice received from at least one external device. The processor 120 may acquire information on the user's voice through a plurality of devices included in a device group within a specific space, and perform more accurate voice recognition using information on the obtained user's voice. For example, the processor 120 may extract a component that is commonly included among information on user voices acquired from a plurality of devices, and remove the remaining components by treating them as noise, thereby performing more accurate user voice recognition.

The processor 120 may determine a control target device from among the devices included in the device group based on the voice recognition result and transmit the control command corresponding to the voice recognition result to the determined control target device. Specifically, when recognizing the user voice "Turn off the TV" as a result of voice recognition, the processor 120 may determine "TV" as the control target device, and transmit the control command "turn off" corresponding to the voice recognition result to the determined control target device through the communication interface 110. The processor 120 can determine the control target device and generate a control command using a pre-stored recognition model, and determine a control target device in link with an external server and generate a control command.

If the user voice is determined to be a command to control all of the devices included within the device group, the processor 120 may control the communication interface 110 to transmit a control command to all devices included within the device group. For example, if the processor 120 recognizes the user voice "I will sleep now. Turn everything off", the processor 120 may determine all the devices in the device group as a control target device, and control the communication interface 110 to transmit a control command for "turn off" to all the devices of the device group.

When the control target device is not included among the devices included in the device group, the processor 120 may control the communication interface 110 to send a signal requesting confirmation of the control target device to the external device. The external device may be a hub device or an external server, but is not limited thereto. For example, if the user voice "Turn TV off" is recognized, when there is no "TV" in the device group, the processor 120 may control the communication interface 110 to transmit a signal requesting confirmation of the control target device to a hub device or an external server. The hub device or the external server may identify the "TV" provided in the house in response to the request signal, and may transmit "Turn off" command to the identified device.

The processor 120 may check the location information of the user who spoke based on the information about the devices included in the device group and the information about the user's voice received from at least one external device. When the device included in the device group is a "refrigerator", and a user voice called "Tell me about the pasta recipe" is recognized, the processor 120 may identify that a space where a user is positioned is kitchen based on information on the devices included in the device group and information on a user voice.

Figure 2B:
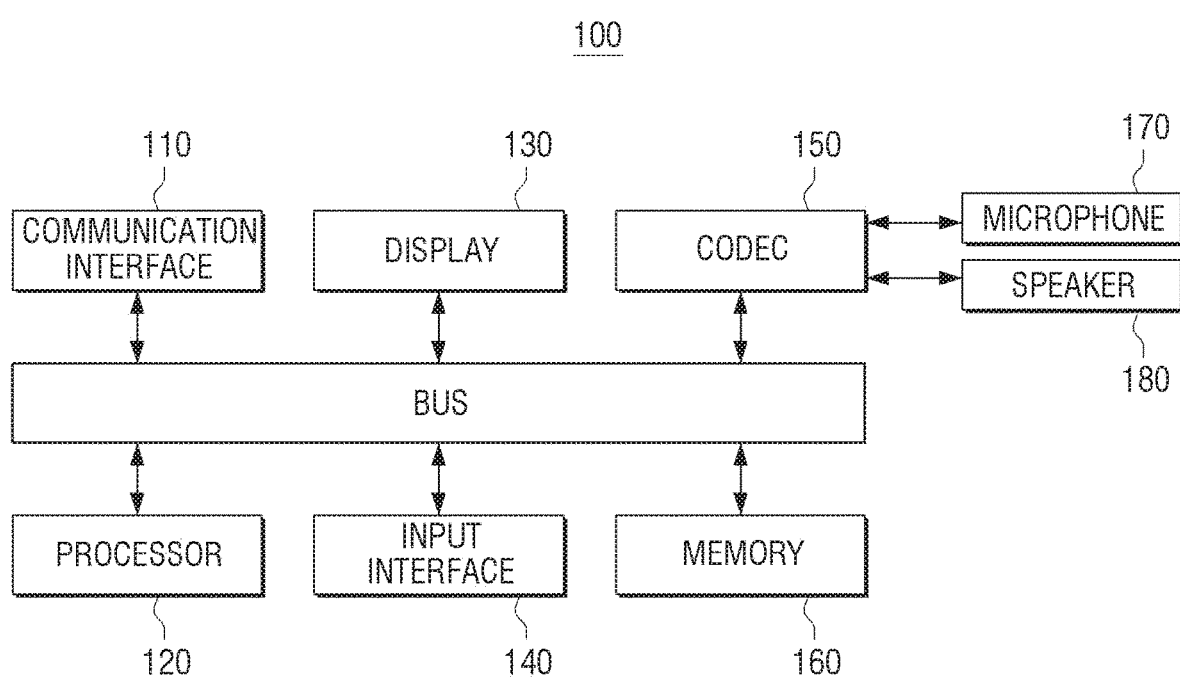
FIG. 2B is a block diagram briefly illustrating a configuration of an electronic device according to an embodiment of the disclosure.

FIG. 2B is a block diagram illustrating the configuration of an electronic apparatus in detail according to an embodiment of the disclosure.

Referring to FIG. 2B, the electronic device 100 includes the communication interface 110, the processor 120, a display 130, an input interface 140, a codec 150, a memory 160, a microphone 170, and a speaker 180. The configurations illustrated in FIG. 2B are views to implement the embodiments of the disclosure, and the hardware/software configurations which are obvious to those skilled in the art may be included in the electronic device additionally.

The communication interface 110 communicates with an external device. In particular, the communication interface 110 may include a radio frequency (RF) communication module, a Bluetooth (BT) communication module, and a Wi-Fi communication module. Each communication module may be implemented as a communication chip, a communication circuit, and communication interface, etc.

The RF communication module may receive RF signals of various RF-ID frequency bands such as 135 kHz, 13.56 MHz, 433 MHz, 860 to 960 MHz, and 2.45 GHz. The RF communication module includes a plurality of antennas for receiving an RF signal broadcast by an external device. When a plurality of signal processing units for processing signals received by the plurality of antennas are provided, the plurality of signal processing units can simultaneously process the RF signals broadcast from the IoT device. However, when one signal processing unit for processing a signal received by a plurality of antennas is provided, the signal processing unit may process the broadcasting RF signals from an external device through a switching operation.

The BT communication module and the Wi-Fi communication module transmit/receive various connection information such as a service set identifier (SSID) and a session key, first, by using a Bluetooth chip or a Wi-Fi chip, and then transmit/receive various information after communicating using the connection information. In particular, the electronic device 100 can communicate with the external device 200 using the BT communication module. The BT communication module and the Wi-Fi communication module may include one or more Bluetooth chips or Wi-Fi chips.

The communication interface 110 may communicate with the external device 200 through various communication modules such as Zigbee communication module and near field communication (NFC) communication module.

The display 130 displays various video data and user interface (UI). The display 130 may provide a UI for receiving a user command to designate a device group and provide various UIs for controlling a device group.

According to an embodiment of the disclosure, the display 130 may be implemented as a touch screen in combination with the touch sensing unit. The display may be coupled to at least one of a front area, a side area, and a rear area of the electronic device 100 in a form of a flexible display. The flexible display may be bent, folded, or rolled through a thin and flexible substrate like paper, without damage.

The input interface 140 may receive various user input and communicate the user input to the processor 120. The input interface 140 may include, for example, a touch panel, a (digital) pen sensor, or a key. The touch panel can employ, for example, at least one of an electrostatic type, a pressure sensitive type, an infrared type, or an ultrasonic type. The touch panel may further include a control circuit. The touch panel further includes a tactile layer to provide a tactile response to the user. The (digital) pen sensor may be a part of a touch panel or may include a separate recognition sheet. The key may include a physical button, an optical key, or a keypad.

The codec 150 may process an analog sound signal received through the microphone 170 as a digital signal, and may process a digital signal as a format which can be output through a speaker 180. The codec 150 may include an encoder for encoding a sound signal and a decoder for decoding a sound signal.

The codec 150 may be configured as a separate hardware, or may be implemented as software.

The memory 160 may store various programs and data necessary for the operation of the electronic device 100. The memory 160 may be implemented as a non-volatile memory, a volatile memory, a flash memory, a hard disk drive (HDD), or a solid state drive (SSD). The memory 160 is accessed by the processor 120 and performs read/write/modify/delete/update of data by the processor 120. The term memory refers to a memory 160 (not shown), a ROM (not shown), a RAM (not shown) in the processor 120, or a memory card (not shown) provided on the electronic device 100 (for example, a micro SD card and a memory stick).

In addition, the memory 160 may store programs and data for configuring various screens to be displayed in the display area of the display 130. The memory 160 may store information on the external device in the form of a device table. The information on the external device may include identification information of the external device, type information of the external device, whether or not the external device includes the microphone, whether the external device recognizes the triggered voice, and the like, but is not limited thereto.

The microphone 170 is a configuration for receiving a user voice. The microphone 170 may receive a user voice for controlling devices in the device group. The microphone 170 may be provided in the electronic device 100, but the microphone 170 may be remotely positioned from the electronic device 100 and wired or wirelessly connected.

The speaker 180 is a structure for outputting audio. The speaker 180 may output a sound signal having a frequency of a specific pattern under the control of the processor 120. The sound signal may be a sound signal beyond the audible frequency range that the user can hear. The sound signal may have a specific frequency and waveform to identify the electronic device 100.

The processor 120 controls the overall operation of the electronic device 100 using various programs stored in the memory 160. The processor 120 is electrically coupled to the communication interface 110, the display 130, the input interface 140, the codec 150, and the memory 160 to control overall operations and functions of the electronic device 100.

The processor 120 may control the overall operation of the electronic device 100 using a general-purpose processor, and the functions of the electronic device 100 (in particular, voice recognition function, control target device determination function, etc.) can be performed using an artificial intelligent processor.

The processor 120 may also include a sub-processor for triggering the function of the electronic device 100 during the standby mode and a main processor for controlling the function of the electronic device 100 during the normal mode. The sub-processor can be implemented with lower power than the main processor. The sub processor and the microphone may be activated while the electronic device 100 is in the standby mode, and when a user command for activating the standby mode to the normal mode is input, the sub processor is deactivated and the main processor is activated to control the electronic device 100.

The processor 120 transmits a signal (e.g., a sound signal) to a plurality of external devices communicably connected to the electronic device 100, and receives intensity information of a signal sensed by the external device from each of the plurality of external devices, and a response signal including identification information through the communication interface 110, and may designate at least one external device and an electronic device among a plurality of external devices as a device group based on the response signal. This will be described later with reference to the drawings.

When the electronic device 100 is implemented as a mobile electronic device, the electronic device 100 may further include a driving unit (not shown) for moving the electronic device.

Figure 3:
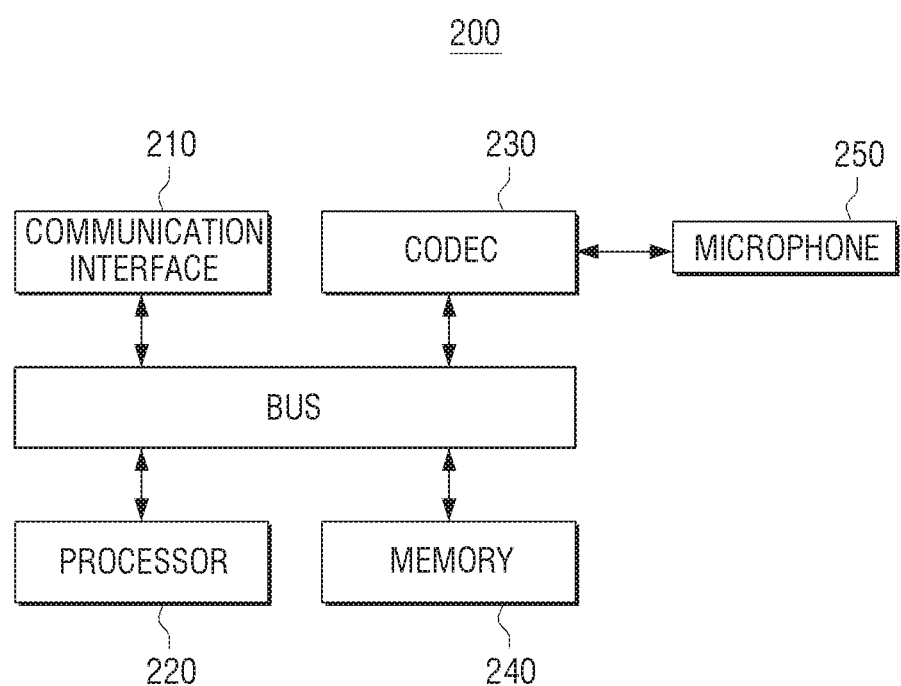
FIG. 3 is a block diagram illustrating a configuration of an external device according to an embodiment of the disclosure.

FIG. 3 is a block diagram showing the configuration of an external device according to an embodiment of the disclosure.

Referring to FIG. 3, the external device 200 may include a communication interface 210, a processor 220, a codec 230, a memory 240, and a microphone 250. The communication interface 210, the processor 220, the codec 230, the memory 240, and the microphone 250 may perform the same function as the communication interface 110, the processor 120, the codec 150, the memory 160, and the microphone 170 as illustrated in FIG. 2B and thus, a redundant description will be omitted.

The microphone 250 may receive the sound signal transmitted by the electronic device 100. The processor 220 may acquire intensity information of the sound signal received through the microphone. The processor 220 may control the communication interface 210 to generate a response signal including intensity information of the sound signal, frequency information of the sound signal, identification information of the external device, and the like, and transmit the generated response signal to the electronic device 100 via the communication interface 210.

According to one embodiment of the disclosure, the external device 200 may further include a configuration (e.g., a sub-processor or the like) for receiving a triggered voice for activating a voice recognition function during a standby mode. While the external device 200 is operating in the standby mode, the microphone 250 and a part (e.g., a sub-processor) of the processor 220 may be activated to receive the triggered voice.

When the triggered voice is received, the processor 220 may control the communication interface 210 to activate the external device 200 from a standby mode to a normal mode, and transmit the information on the triggered voice to the electronic device 100.

According to another embodiment of the disclosure, the external device 200 may not include a configuration for receiving the triggered voice. In this case, when the trigger signal is received from the electronic device 100, the processor 220 can switch the mode of the external device 200 from the standby mode to the normal mode.

FIG. 4 is a sequence drawing of an embodiment for designating a device group using a sound signal by an electronic device according to an embodiment of the disclosure.

The electronic device 100 detects whether a device group designation event has occurred in operation S405. The device group designation event includes an event in which a user command is input for designating a device group, an event in which information on a new external device is acquired in the electronic device 100, an event in which a predetermined period arrives, and an event whose motion of the electronic device 100 is greater than or equal to a preset value, and the like.

When a device group designation event is generated, the electronic device 100 transmits a command for activating the microphone to the plurality of external devices 200-1 and 200-2 in operation S410. The plurality of external devices 200-1 and 200-2 can activate a microphone provided in the external device in response to the command.

The electronic device 100 transmits a sound signal to the first external device 200-1 and the second external device 200-2 in operation S415. The sound signal may have a specific pattern of frequencies to identify the electronic device 100. In addition, a sound signal beyond the audible frequency in order not to interfere with the user's viewing of the content may be output.

Each of the first external device 200-1 and the second external device 200-2 confirms the intensity of the received sound signal in operation S420. The first external device 200-1 may acquire the first intensity information of the sound signal received through the microphone included in the first external device 200-1, and acquire the first intensity information of the sound signal received through the microphone included in the first external device 200-1. The first intensity information and the second intensity information may be different depending on the distance between the electronic device 100 and the external device 200 and an obstacle (e.g., a wall).

Each of the first external device 200-1 and the second external device 200-2 transmits a response signal in operation S430. The response signal may include information on the intensity of the sound signal acquired by the external device 200, frequency information of the sound signal, and identification information of the external device 200 and the like.

The electronic device 100 designates a device group based on the response signal in the operation S440. The electronic device 100 may designate a device group based on intensity information of the sound signal acquired by the external device 200 included in the response signal, frequency information of the sound signal, identification information of the external device 200. The electronic device 100 can identify at least one external device whose intensity information of the sound signal included in the response signal among the plurality of external devices 200-1 and 200-2 is equal to or greater than a preset value. The electronic device 100 may designate at least one identified external device and the electronic device 100 as one device group. For example, when the electronic device 100 and the first external device 200-1 are present in one space (e.g., a bedroom) and the second external device 200-2 is present in another space (e.g., a living room), the electronic device 100 may identify the intensity information which is equal to or greater than a preset value based on the intensity information included in the response signals of the first and second external devices 200-1 and 200-2, and designate the identified first external device 200-1 and the electronic device 100 as one device group.

Figure 5A:
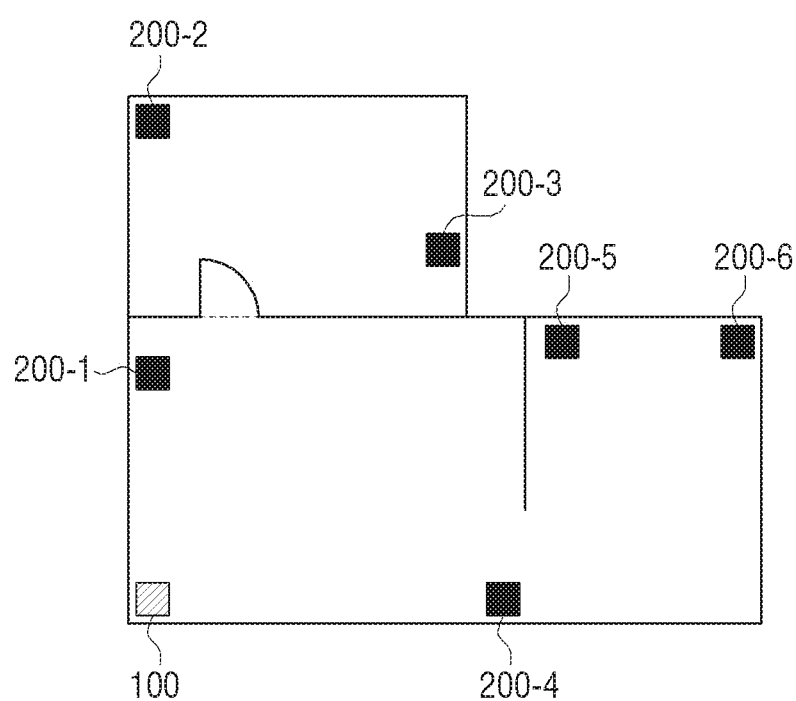
FIGS. 5A, 5B, and 5C are views to describe an embodiment of designating a device group using a sound signal by an electronic device according to an embodiment of the disclosure.
Figure 5B:
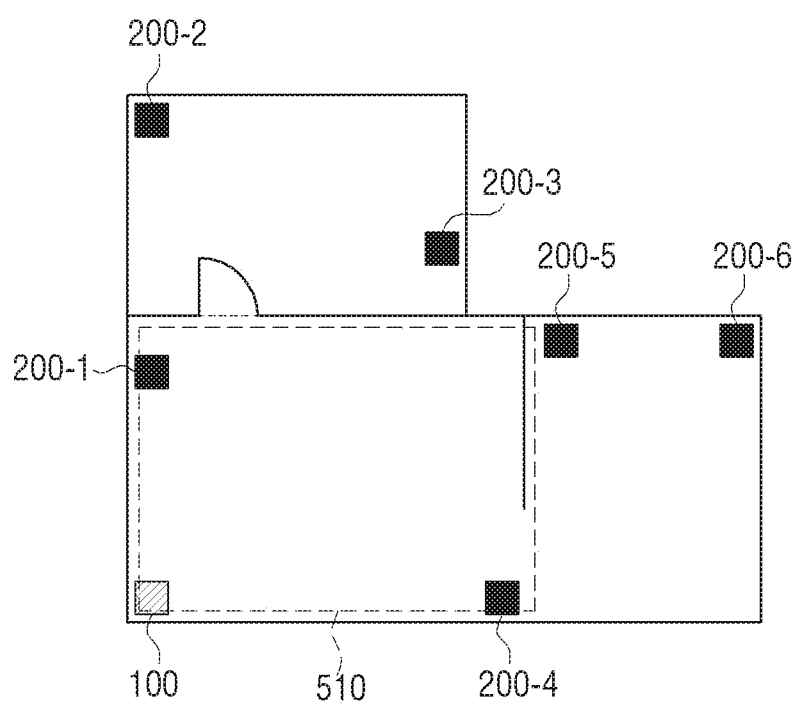
Figure 5C:
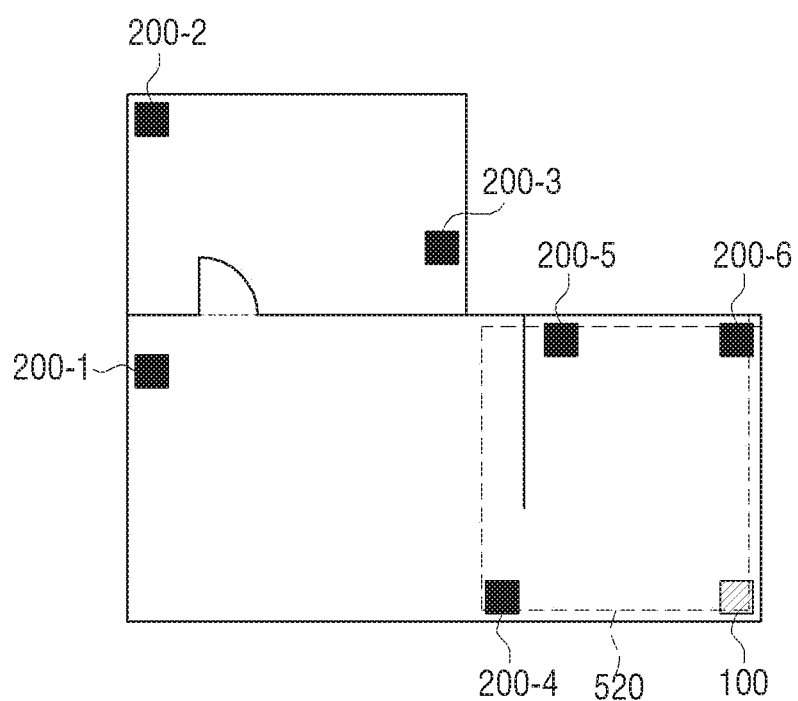

FIGS. 5A, 5B, and 5C are views to describe an embodiment of designating a device group using a sound signal by an electronic device according to an embodiment of the disclosure.

Referring to FIG. 5A, the system includes the electronic device 100 and a plurality of external devices 200-1 to 200-6. As illustrated in FIG. 5A, the electronic device 100 and the first external device 200-1 are located in the living room; the second external device 200-2 and the third external device 200-3 are located in the living room; the fifth external device 200-5 and the sixth external device 200-6 are located in the second bedroom; and the fourth external device 200-4 is located at a border between the living room and the second bedroom.

The electronic device 100 and the plurality of external devices 200-1 to 200-6 are communicatively connected to each other, and the electronic device 100 can store the device table as shown in the following table. At this time, the apparatus table can be received and stored from the plurality of external devices 200-1 to 200-6 in the process of communicating with the plurality of external devices 200-1 to 200-6 by the electronic device 100.

TABLE 1

| External device | Identification information | Including microphone | Triggered voice recognition |
| --- | --- | --- | --- |
| First external device | XXXX1 | O | O |
| Second external device | XXXX2 | X | X |
| Third external device | XXXX3 | O | X |
| Fourth external device | XXXX4 | O | X |
| Fifth external device | XXXX5 | O | O |
| Sixth external device | XXXX6 | O | X |

When a device group designation event occurs while the electronic device 100 is located in the living room, the electronic device 100 may transmit a sound signal to the plurality of external devices 200-1 to 200-6 for device group designation, and the plurality of external devices 200-1 to 200-6 may receive the sound signal transmitted by the electronic device 100 to acquire intensity information. Each of the plurality of external devices 200-1 to 200-6 may transmit a response signal including the intensity information and the identification information of the external device to the electronic device 100.

The electronic device 100 may designate a device group based on the intensity information included in the response signal. The electronic device 100 may identify an external device whose intensity information is equal to or greater than a preset threshold value, and designate a device group including the identified external device. For example, the electronic device 100 may identify the first external device 200-1 and the fourth external device 200-4 whose intensity information of the sound signal is equal to or greater than a preset threshold value. As illustrated in FIG. 5B, the first external device 200-1, the fourth external device 200-4, and the electronic device 100 may be designated as a first device group 510.

When the electronic device 100 is embodied as a portable device, such as a smart phone or a tablet PC, or as a self-moving portable device, such as a robot cleaner, the electronic device 100 may designate a new device group according to the movement of the electronic device 100.

When it is determined that the electronic device 100 is moving by a predetermined distance or more, or when it is determined that a preset period has arrived, the electronic device 100 may detect a device group designation event, and output the sound signals to the external devices 200-1 to 200-6. For example, when the electronic device 100 is located in the living room and is moved to the second bedroom, as shown in FIG. 5C, the electronic device 100 may output a sound signal to the plurality of external devices 200-1 to 200-6. The electronic device 100, based on a response signal received from the plurality of external devices 200-1 to 200-6, may designate the fourth to sixth external devices 200-4 to 200-6 and the electronic device 200 as a second device group 520.

As described above, by designating a new device group in accordance with the movement of the electronic device 100, a user can control a plurality of devices included in a place where a user is located through the electronic device 100.

Figure 6:
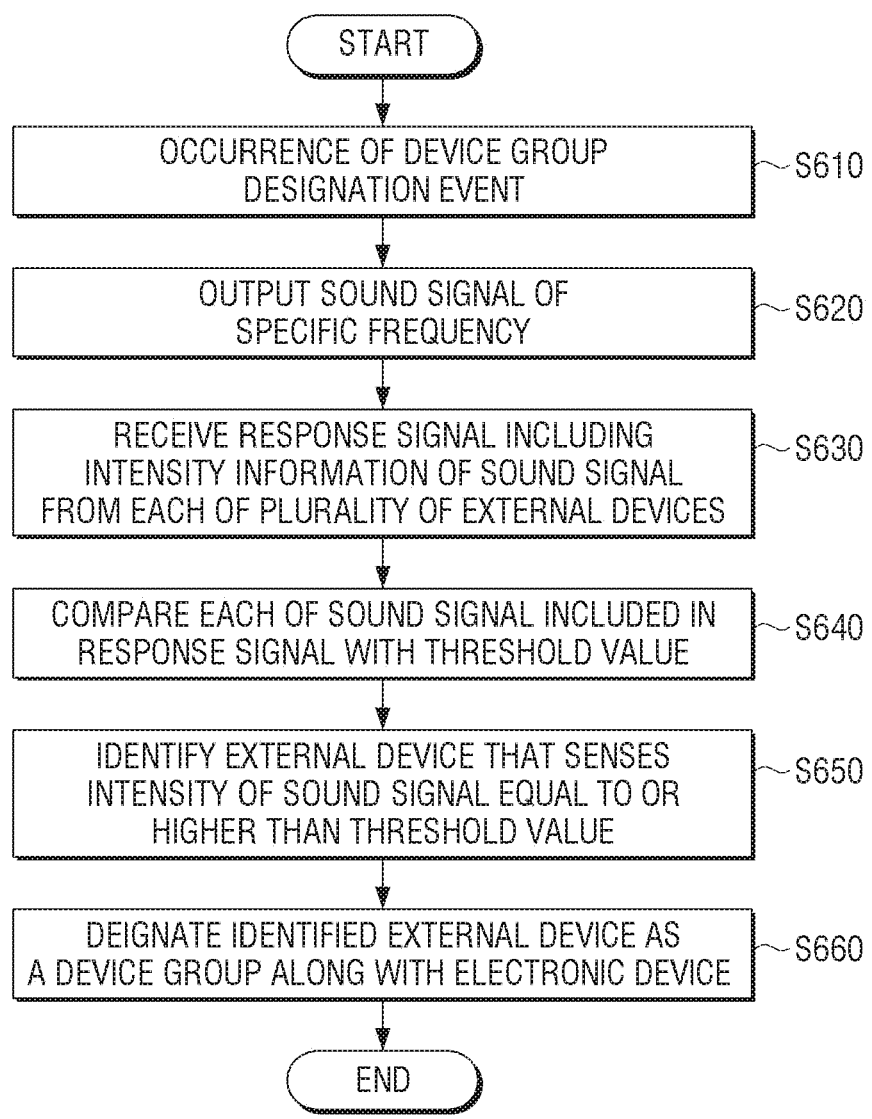
FIG. 6 is a flowchart to describe an embodiment of designating a device group using a sound signal by an electronic device according to an embodiment of the disclosure.

FIG. 6 is a flowchart of a method of designating a device group using a sound signal by an electronic device according to an embodiment of the disclosure.

The electronic device 100 detects occurrence of an event for device group designation in operation S610. When a user command for designating a device group is input from a user, a new external device is added, a preset period of time is reached, or the electronic device 100 moves over a predetermined distance, the electronic device 100 may detect that an event for designating a device group has occurred. When an event occurrence for designating a device group is detected, the electronic device 100 may transmit a signal including a command to activate a microphone included in an external device to a plurality of external devices.

The electronic device 100 outputs a sound signal of a specific frequency in operation S620. The sound signal is a sound signal having a specific waveform and frequency for identifying the electronic device 100, and may have frequencies beyond the audible frequency range so as not to disturb the user's viewing of the contents.

The electronic device 100 receives the response signal including the intensity information of the sound signal from each of the plurality of external devices in operation S630. The response signal may include not only the intensity information of the sound signal sensed by the external device but also the identification information of the external device and the frequency information of the sound signal. The electronic device 100 may identify the external device that transmitted the response signal through the identification information of the external device, and may identify the sound signal transmitted by the electronic device 100 through the frequency information.

The electronic device 100 compares each of the sound signals included in the response signal with a threshold value in operation S640. The threshold value can be determined according to the rate at which the intensity of the sound signal is reduced by the wall or the distance. For example, if the electronic device 100 transmits a sound signal at an intensity of 70 dB, the threshold may be 50 dB.

The electronic device 100 identifies an external device that senses the intensity of the sound signal equal to or higher than the threshold value in operation S650. The electronic device 100 may identify an external device that has transmitted a response signal including intensity information of a threshold value or more among a plurality of external devices that transmitted a response signal.

The electronic device 100 designates the identified external device as a device group together with the electronic device 100 in operation S660. The electronic device 100 may determine the identified external device as a device which is positioned in the same space as the electronic device 100 and designate a device group as a device for receiving a user voice command.

Figure 7:
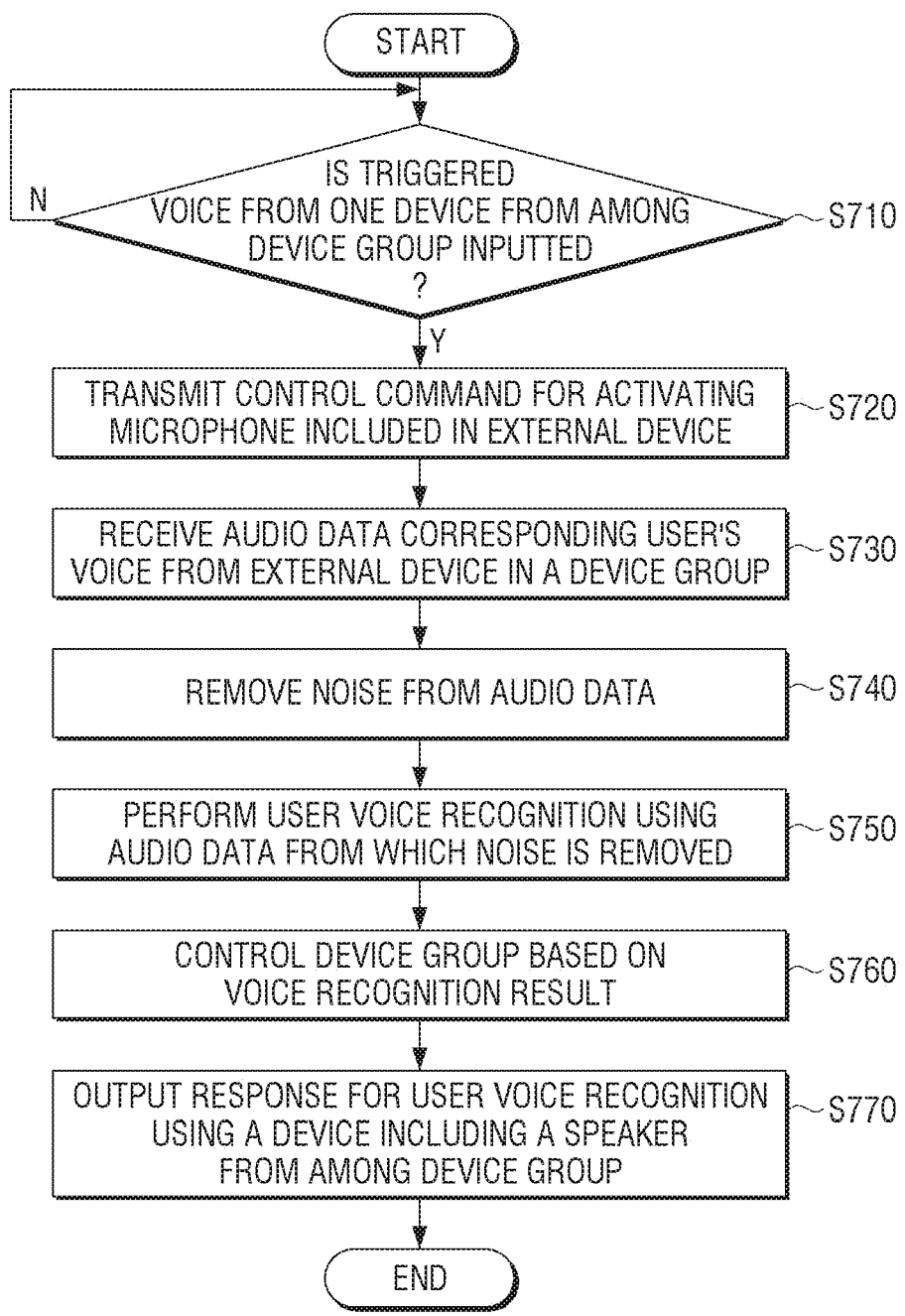
FIG. 7 is a flowchart to describe an embodiment of controlling a device group by an electronic device according to an embodiment.

FIG. 7 is a flowchart of a method of controlling a device group by an electronic device according to an embodiment of the disclosure.

Referring to FIG. 7, after the device group is designated, the electronic device 100 confirms whether a triggered voice is input from one device of the device group in operation S710. The electronic device 100 may receive the triggered signal from the external device capable of recognizing the triggered voice among the devices included in the device group, and may confirm whether or not the triggered voice is input. The electronic device 100 may directly receive the triggered voice. The electronic device 100 and the external devices included in the device group can maintain the standby mode before receiving the triggered voice.

When the triggered voice is input at operation S710-Y, the electronic device 100 transmits a control command for activating the microphone included in the external device at operation S720. The external devices may not activate the microphones until a triggered voice is input to prevent unnecessary power consumption. When a control command for activating the microphone is transmitted from the electronic device 100, the external device can activate the microphone to receive the user's voice. Activating the microphone may mean turning on the microphone or running software for user voice recognition.

The electronic device 100 receives audio data corresponding to the user's voice from an external device in the device group at operation S730. The device group is devices positioned in one space, and when the user utters the user's voice in one space, the electronic device 100 included in the device group and the external device 200 including the microphone may receive the user's voice. The electronic device 100 can receive audio data corresponding to the user's voice from the electronic device 100 included in the device group.

The electronic device 100 removes noise from the audio data at operation S740. The electronic device 100 may analyze audio data received from devices included in a device group located in one space to remove external noise, and extract common components to extract audio data related to the user's voice.

The electronic device 100 performs user voice recognition from the noise-removed audio data at operation S750. The electronic device 100 can perform voice recognition using audio data through a voice recognition module stored in the memory 160. Alternatively, the electronic device 100 may perform voice recognition by transmitting the noise-removed audio data to a server for external voice recognition.

The electronic device 100 controls the device group based on the voice recognition result at operation S760. The electronic device 100 may generate a control command corresponding to the user's voice using the text data obtained based on the voice recognition result. The electronic device 100 may generate a control command corresponding to a user's voice using an artificial intelligence-based recognition model. The recognition model may be a recognition model that is learned using the text data corresponding to the user's voice and set to estimate the control command. Alternatively, the electronic device 100 may send text data to a server that stores a recognition model and may receive control commands that result from applying text data from a server to a recognition model.

In one embodiment of the disclosure, the electronic device 100 or an external server may determine the control target device based on the text data corresponding to the user's voice. The electronic device 100 or an external server may transmit a control command corresponding to the voice recognition result to the determined control target device.

When the control target device is included in the text data corresponding to the user's voice, the electronic device 100 may determine whether or a control target device is included in the text data in the previously designated device group. For example, when the text data corresponding to the user voice is "Turn TV off", the electronic device 100 may determine whether or not there is a "TV" which is a control target device within a predetermined device group. When the control target device "TV" is in the device group, the electronic device 100 may transmit a control command "Turn off" to the control target device. Alternatively, when the control target device "TV" is not present in the device group, the electronic device 100 may transmit a signal requesting confirmation of the control target device to an external device (e.g., a hub device). The external device confirms the control target device in response to the request signal, and transmits the control command to the control target device included in the house.

The external device may estimate the position of the control target device based on the information of the device group. For example, when the TV is a control target device in addition to the space where the device group exists, an external device (e.g., a hub device) identifies a TV that is located outside the space in which the device group exists, and transmit the control command "Turn off" to the identified TV. Alternatively, if the user voice is determined to be a command for controlling all of the devices included in the device group, the electronic device 100 may transmit a control command to all devices included in the device group. For example, when the text data corresponding to the user's voice inputted while a plurality of apparatuses reproduce content in the device group is "turn everything off", the electronic device 100 may transmit to all the devices in the pre-determined device group a control command "Turn off" or "enter the standby mode" which is a "mute" command, and the electronic device 100 can turn itself off or enter the standby mode.

The electronic device 100 outputs a response to the user voice recognition result using a device including a speaker in the device group at operation S770. The electronic device 100 may output the response message through the speaker as a result of performing the control command. For example, when the text data corresponding to the user's voice is "I'm sleepy", the electronic device 100 can output "I will turn everything off, sleep well" through a speaker. The response message may be a result generated by applying the control command or the voice recognition result to the artificial intelligence-based recognition model. The electronic device 100 may also directly output a response message through a speaker included in the electronic device 100, and may also transmit a control command for outputting a response message to an external device including a speaker among external devices in the device group. The electronic device 100 may determine an external device to output a response message based on the intensity information of the user's voice received from a plurality of external devices. The electronic device 100 may identify an external device closest to the user among a plurality of external devices based on the intensity information of the user's voice, and transmit a control command for outputting a response message to the identified external device. When the external device reproduces music contents, the electronic device 100 may select another external device having a speaker and transmit a control command for outputting a response message.

The electronic device 100 may sense a space where the user is located based on the information about the devices in the device group. In the case of the text data "robot cleaner, clean up here" corresponding to the user voice, the electronic device 100 may confirm the place where the current user is located based on the information on the devices in the device group. For example, if one of the devices in the device group is a refrigerator, the electronic device 100 may confirm that the current user's location is a kitchen and send a control command to clean the kitchen with the robot cleaner. Alternatively, if one of the devices in the device group is a TV, the electronic device 100 may confirm that the place where the current user is located is a living room, and transmit a control command to clean the living room with the robot cleaner.

Embodiments in which a plurality of device groups for a plurality of spaces are designated by using a hub device other than an electronic device are described below.

Figure 8:
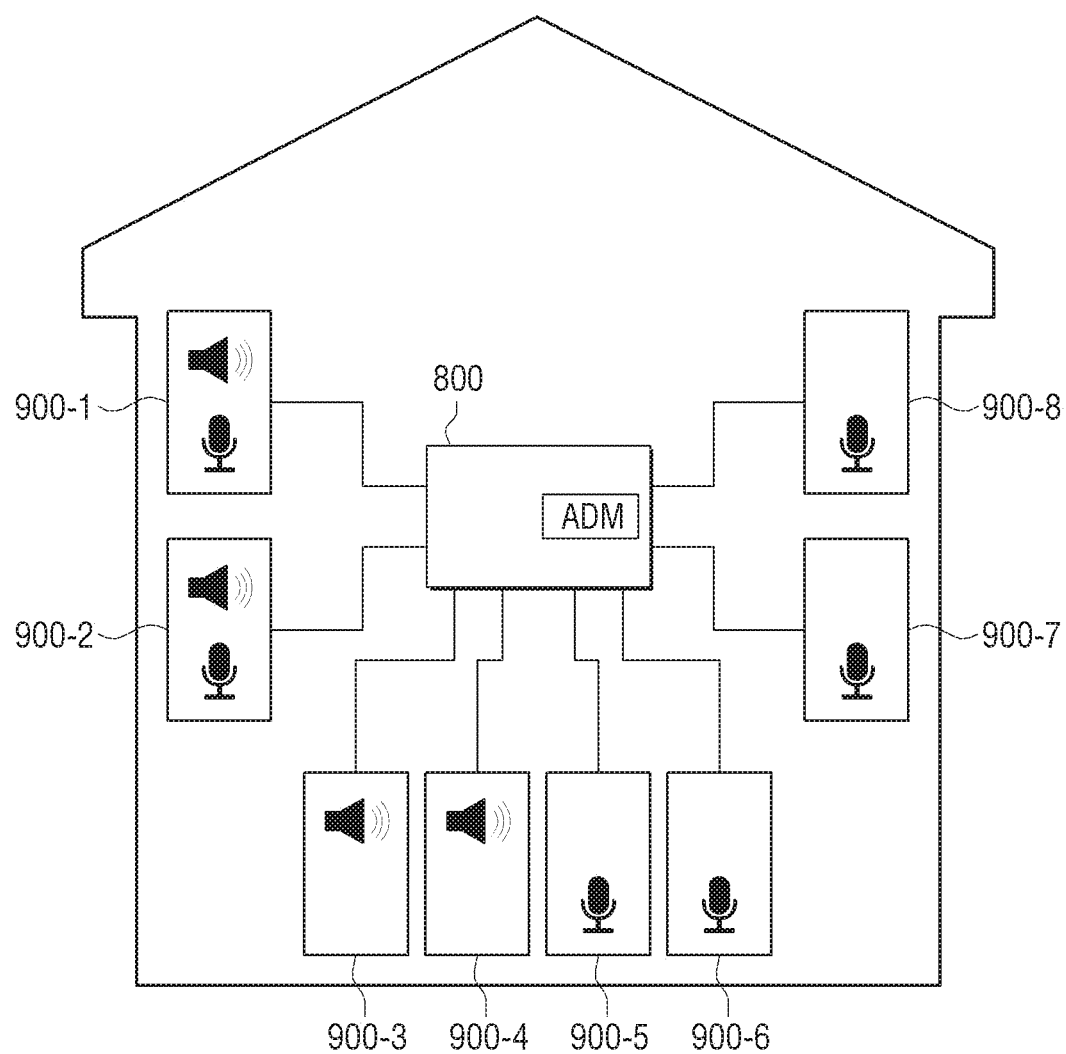
FIG. 8 is a system including an electronic device and a hub device according to an embodiment of the disclosure.

FIG. 8 is a system including an electronic device and a hub device, according to one embodiment of the disclosure.

Referring to FIG. 8, the system may include a hub device 800 and a plurality of electronic devices 900-1 to 900-8. The plurality of electronic devices 900-1 to 900-8 include electronic devices 900-1 and 900-2 having speakers and a microphone at the same time, electronic devices 900-3 and 900-4 having only speakers, and electronic devices 900-5 to 900-8 having only a microphone. At this time, the electronic devices 900-1 to 900-4 including speakers are referred to as a speaker device, and the electronic devices 900-5 to 900-8 having a microphone are referred to as a microphone device.

The hub device 800 may include an acoustic device manager (AMD) module. The AMD module may designate a plurality of device groups using a speaker device and a microphone device and control the designated plurality of device groups as a user sound, and may include software and a dedicated processor.

The AMD module may provide a wired/wireless communication connection function with the speaker device and the microphone device, and may control and monitor the connected speaker device and a microphone device, configure a device table of a speaker device and a microphone device, generate and analyze digital audio data, and generate and manage a device group.

The AMD module may store a device table for the speaker device and the microphone devices, and the device table may store information about the speaker device (e.g., model name, S/N information, outputtable frequency range, etc.), information about the microphone device (e.g., model name, S/N information, receivable frequency range, whether or not the trigger function is supported), and information about the device group.

The hub device 800 may designate a plurality of device groups using an AMD module. The hub device 800 may detect occurrence of an event for device group designation. For example, the hub device 800 may receive an event in which a user request for device group designation is received, an event in which a new microphone device or a speaker device is registered in addition to an existing microphone device or a speaker device.

When an event occurrence for designating a device group is detected, the hub device 800 may assign frequency and waveform to the device to a plurality of speaker devices. The hub device 800 may then transmit a control command for activating the microphone to the speaker device and the microphone device.

The hub device 800 may transmit a control command to transmit frequency and waveform information allocated to a plurality of speaker devices and to output a sound signal having allocated frequency and waveform information.

The plurality of speaker devices 900-1 to 900-4 may output a sound signal having assigned frequency and waveform information. The plurality of speaker devices 900-1 to 900-4 may output a sound signal simultaneously or sequentially.

The electronic devices 900-3 to 900-8 including a microphone receives the sound signal output from the plurality of speaker devices 900-1 to 900-4 and obtains the intensity information of the received sound signal. The devices 900-3 to 900-8 including the microphones send response signals including the intensity information of the received sound signal, the frequency and waveform information of the sound signal, and information about the device including the microphone to the hub device 800.

The hub device 800 may designate a plurality of device groups based on response signals received from the devices 900-3 to 900-8 including the microphones. The hub device 800 may determine the microphone device and the speaker device located in the same space based on the intensity information of the sound signal and the frequency and waveform information of the sound signal, and designate the device group. For example, the hub device 800 may designate the microphone devices having an intensity which is greater than or equal to a threshold value from among the microphone devices receiving a sound signal transmitted from the first speaker device 900-1 as the first device group along with the first speaker device 900-1 and designate microphone devices having an intensity which is greater than or equal to a threshold value, from among the microphone devices receiving a sound signal transmitted from the second speaker device 900-2, as a second device group along with the second speaker device 900-2.

When a user's voice is input from at least one of the plurality of device groups, the hub device 800 may receive audio data for the user voice from at least one device group, and perform voice recognition for the audio data. The hub device 800 may then control an electronic device or a device group in the house based on the voice recognition result.

Figure 9A:
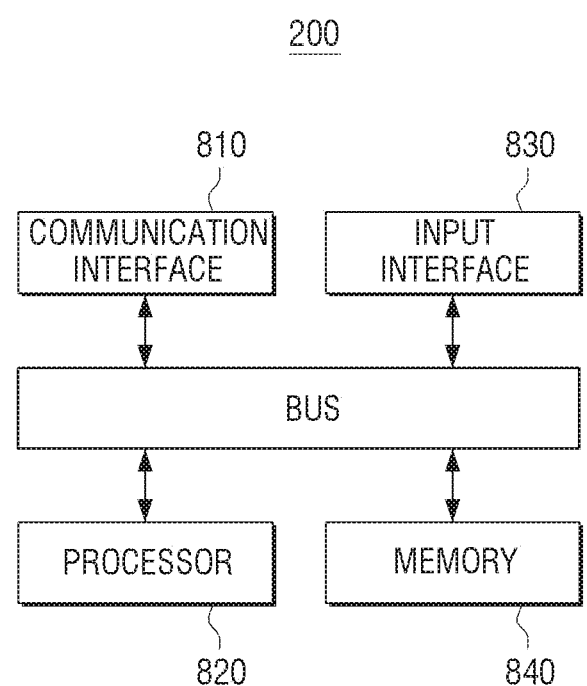
FIG. 9A is a block diagram illustrating a configuration of a hub device according to an embodiment of the disclosure.

FIG. 9A is a block diagram showing a configuration of a hub device according to an embodiment of the disclosure.

Referring to FIG. 9A, the hub device 800 may include a communication interface 810, a processor 820, an input interface 830, and a memory 840. The configuration of the hub device 800 shown in FIG. 9A is merely an embodiment; and other components may be added according to the embodiment of the hub device 800. For example, when the hub device 800 is implemented as a TV, elements such as a display, a speaker, and the like may be added. The communication interface 810, the processor 820, the input interface 830 and the memory 840 shown in FIG. 9A are similar to the communication interface 110, the processor 120, the input interface 140, and the memory 160 in FIG. 2B and thus, redundant description may be omitted.

The communication interface 810 may perform a communication connection with a speaker device and a microphone device in the house. The communication interface 810 may communicate with an external server (e.g., a voice recognition server, a control command search server, a content providing server, etc.)

The input interface 830 may receive a user command for device group designation. Alternatively, the input interface 830 may receive control commands for the home electronics or a device group.

The memory 840 may store the AMD module described above. In addition, the memory 840 may store a device table that includes information about the speaker device, the microphone device, and the device group.

The processor 820 may control the overall operation of the hub device 800. The processor 820 may perform device group designation for the electronic devices located in the house according to the occurrence of the event for designating the device group. The processor 820 may also control the communication interface 810 to send control commands for a specified plurality of device groups. The operation of the processor 820 to perform the device group designation and the transmission of the control command will be described later in detail with reference to the drawings.

Figure 9B:
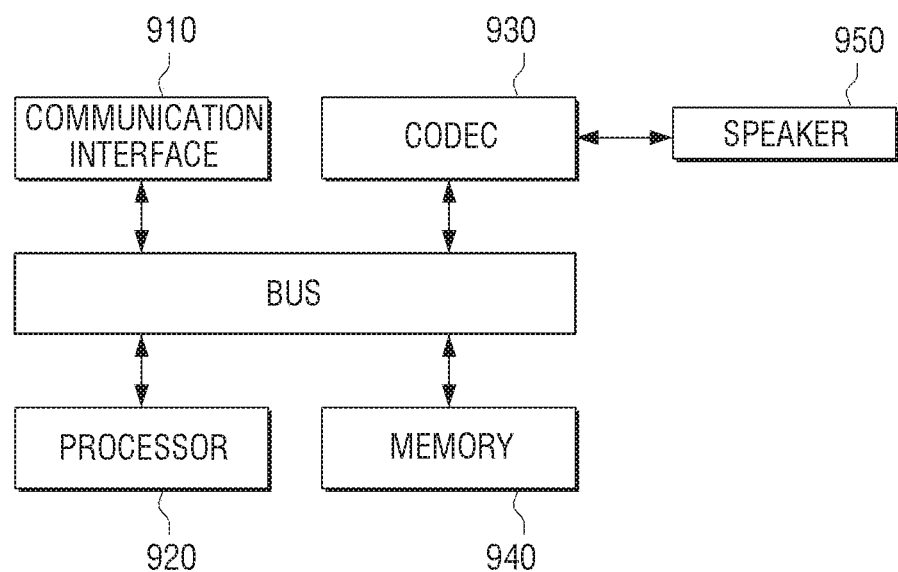
FIG. 9B is a block diagram illustrating a configuration of a speaker device according to an embodiment of the disclosure.
Figure 9C:
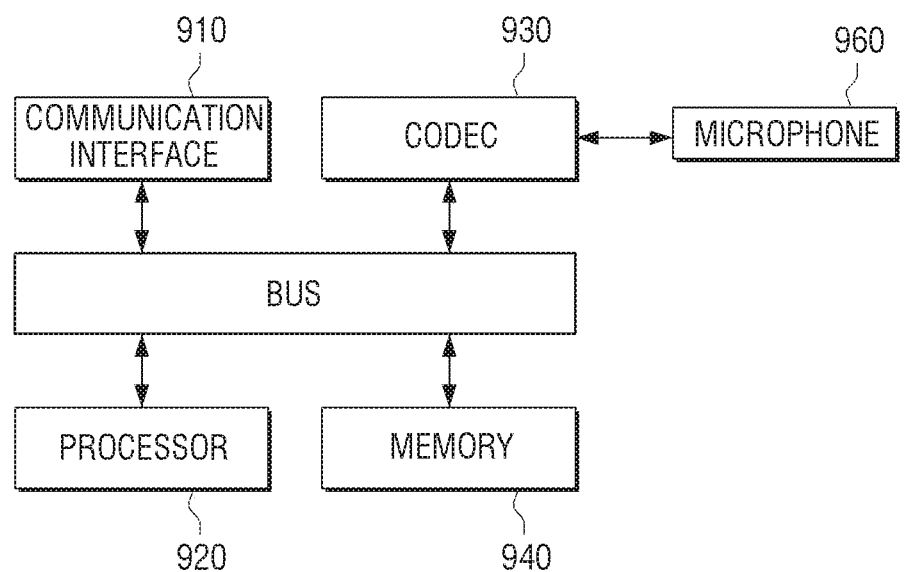
FIG. 9C is a block diagram illustrating a configuration of a microphone device according to an embodiment of the disclosure.

FIGS. 9B and 9C are block diagrams illustrating a configuration of a speaker device and a microphone device according to an embodiment of the disclosure. The speaker device may, as illustrated in FIG. 9B, include a communication interface 910, a processor 920, a codec 930, a memory 940, and a speaker 950. The speaker device may further include a microphone 960. The microphone device may include a communication interface 910, a processor 920, a codec 930, a memory 940, and a microphone 960, as shown in FIG. 9C. The configurations for the speaker device and the microphone device shown in FIGS. 9B and 9C may further include additional configurations (e.g., a display, a functioning unit for performing an operation specific to an electronic device, etc.). The communication interface 910, the processor 920, the codec 930, the memory 940, the speaker 950 and the microphone 960 shown in FIGS. 9B and 9C are similar to the communication interface 110, the processor 120, the codec 150, the memory 160, the speaker 180, and the microphone 170 of FIG. 2B, a duplicate description will be omitted.

The communication interface 910 of the speaker device may receive the frequency and waveform information of the sound signal assigned from the hub device 800. The speaker 950 of the speaker device may output a sound signal having the assigned frequency and waveform.

The microphone 960 of the microphone device receives the sound signal output from the plurality of speaker devices, and the processor 920 of the microphone device may acquire the intensity information of the sound signal output from the plurality of speaker devices. The processor 920 of the microphone device can control the communication interface 910 to transmit a response signal including the intensity information of the sound signal, the frequency and waveform information of the sound signal, and the information of the microphone device.

In addition, some of the microphone devices may include a module capable of performing a triggered voice recognition function. That is, some of the microphone devices can recognize the triggered voice even in the standby mode.

Figure 10:
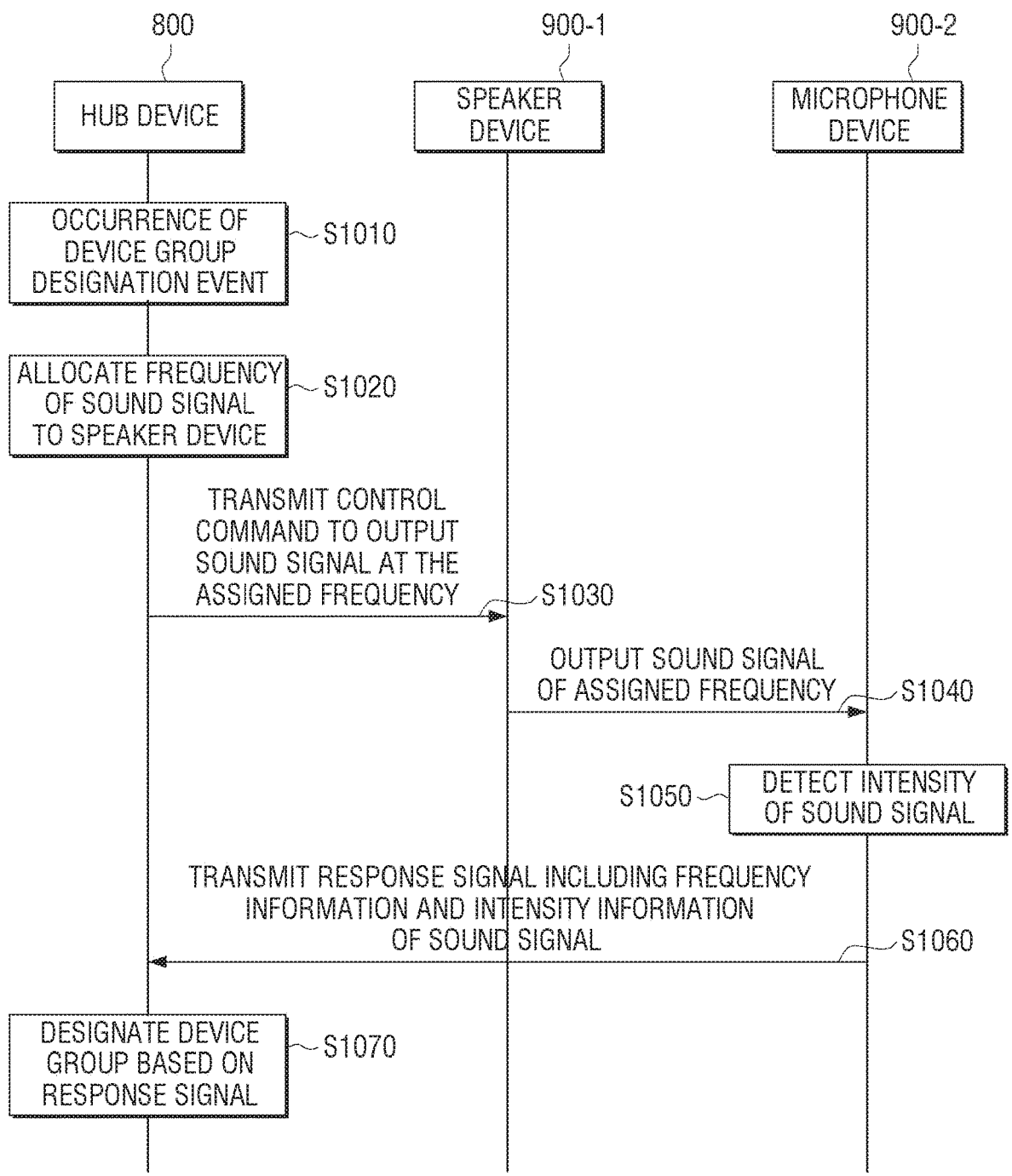
FIG. 10 is a sequence diagram for describing an embodiment of designating a device group by a hub device according to an embodiment of the disclosure.

FIG. 10 is a sequence diagram of a method of designating a device group by a hub device according to an embodiment.

The hub device 800 detects occurrence of an event for device group designation at operation S1010. The event for designating the device group may be an event in which a user command for designating a device group is input, an event in which a new electronic device is registered in the hub device 800, or an event in which a preset frequency is nearing, and the like.

The hub device 800 allocates the frequency of the sound signal to the speaker device at operation S1020. The hub device 800 may assign not only the frequency of the sound signal but also a waveform. Alternatively, the hub device 800 may assign the output order of the sound signal, the output time, and the like, together.

The hub device 800 transmits a control command to the speaker device 900-1 to output the sound signal at the assigned frequency at operation S1030. The control command may include frequency information of the sound signal assigned to the speaker device 900-1, waveform information, output order information, output time information, and the like.

The speaker device 900-1 outputs a sound signal of the allocated frequency in response to the control command received by the hub device 800 at operation S1040. The speaker device 900-1 may generate a sound signal based on at least one of frequency information, waveform information, output order information, and output time information of the sound signal included in the control command and output the sound signal to the outside.

The microphone device 900-2 senses the strength of the sound signal at operation S1050. The microphone device 900-2 can receive the sound signal output from the plurality of speaker devices using the microphone 960 included in the microphone device 900-2.

The microphone device 900-2 transmits a response signal including frequency information and intensity information of the sound signal to the hub device 800 at operation S1060. The microphone device 900-2 may transmit not only the sound signal information but also the information about the microphone device 900-2 to the response signal.

The hub device 800 designates a device group based on the response signal at operation S1070. The hub device 800 confirms the sound signal having the intensity information of the threshold value or more among the intensity information of the sound signal received by the microphone device 900-2, and confirms the frequency information of the confirmed sound signal to identify the corresponding speaker device 900-1. The hub device 800 may designate the identified speaker device 900-1 and the microphone device 900-2 as one device group.

Figure 11A:
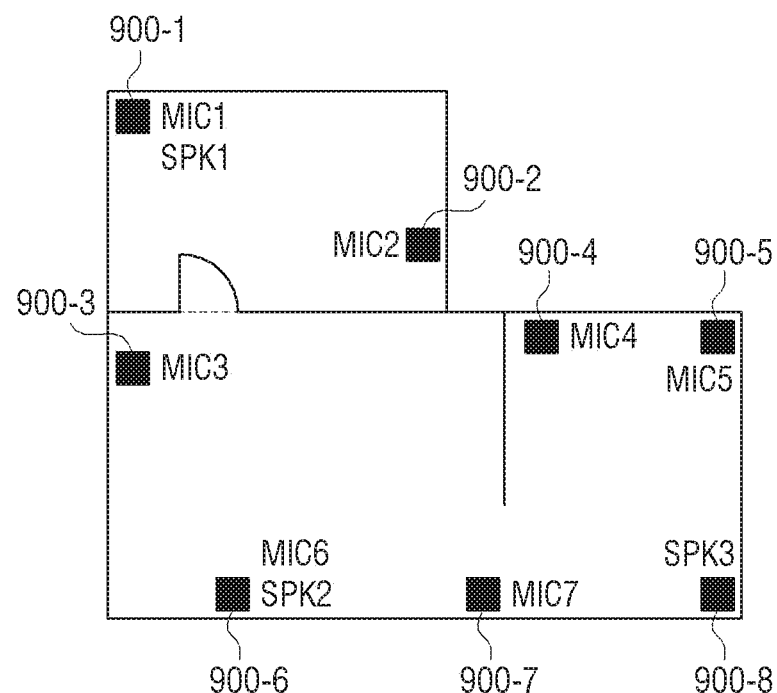
FIGS. 11A and 11B are drawings of an embodiment of designating a device group by a hub device according to an embodiment of the disclosure.
Figure 11B:
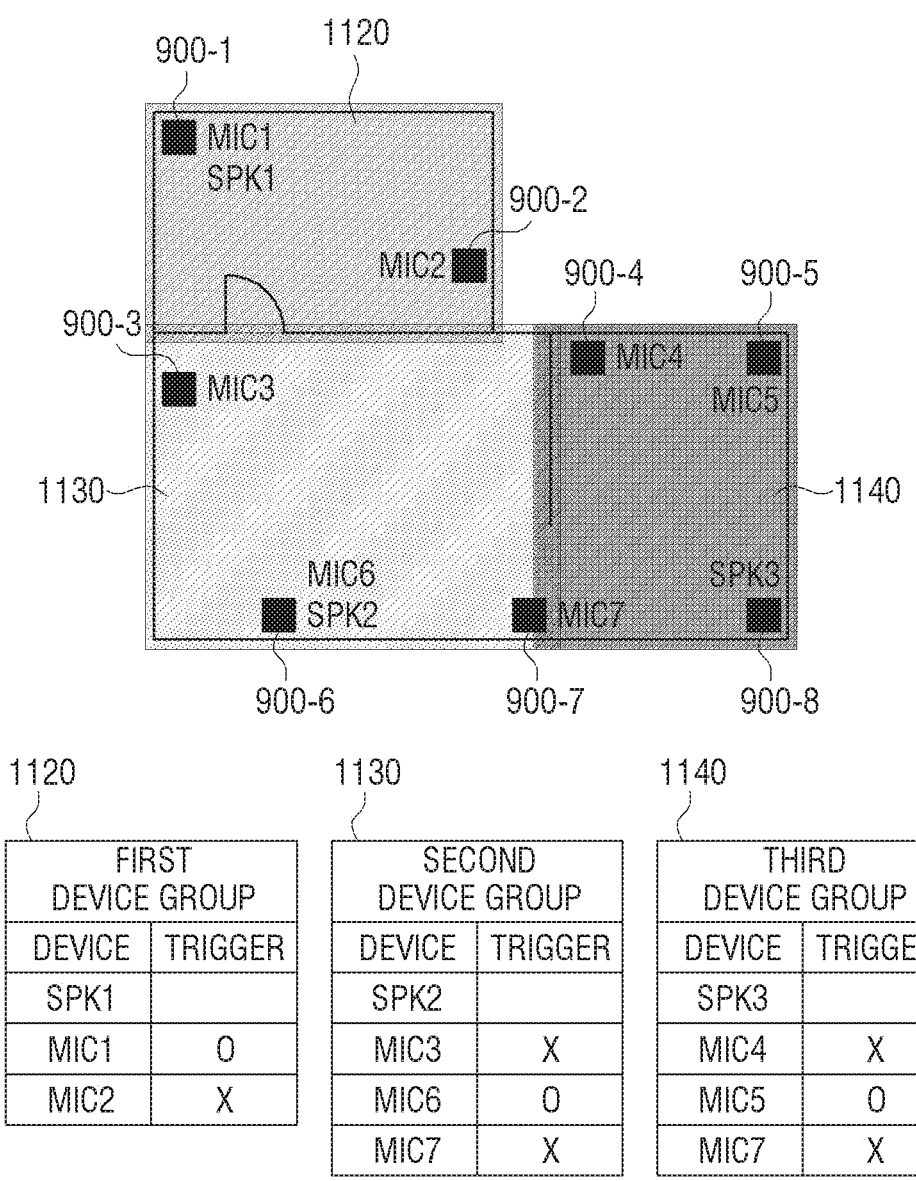

FIGS. 11A and 11B are drawings of an embodiment of designating a device group by a hub device according to an embodiment of the disclosure.

The hub device 800 stores a device table 1110 as shown in FIG. 11A. The device table may be classified and stored as a speaker device including a speaker and a microphone device including a microphone. In the case of a microphone device including a microphone, information on whether or not the triggered voice is recognized can be stored together.

The hub device 800 may detect occurrence of an event for designating a device group.

The hub device 800 may allocate the first frequency, second frequency, and third frequency to each of the first speaker device 900-1, the second speaker device 900-6, and the third speaker device 900-8, which are stored in the device table.

The hub device 800 may transmit frequency information allocated to each of the speaker devices 900-1, 900-6, 900-8 and a control command for outputting a sound signal.

Each of the speaker devices 900-1, 900-6, and 900-8 may output a sound signal having frequency allocated in response to a control command.

Each of the microphone devices 900-1 to 900-7 may receive a sound signal output from each of the plurality of speaker devices 900-1, 900-6, and 900-8, and detect a signal intensity of the received sound signal.

The microphone devices 900-1 to 900-7 may transmit a response signal including the intensity information of the received sound signal, frequency information, and information on the microphone device to the hub device 800.

The hub device 800 can confirm the microphone device that senses the intensity of the sound signal exceeding the threshold value based on the response signal received from the microphone devices 900-1 to 900-7. The hub device 800 may identify the first microphone device 900-1 and the second microphone device 900-2 as a microphone device which senses intensity of a sound signal having the first frequency information of a threshold value or higher based on a response signal; identify the third microphone device 900-3, the sixth microphone device 900-6, and the seventh microphone device 900-7 as a microphone device that senses intensity of a sound signal having the second frequency information; and identify the fourth microphone device 900-4, fifth microphone device 900-5, and the seventh microphone device 900-7 as a microphone device that senses intensity of a sound signal having the third frequency information of a threshold value or higher.

The hub device 800 may designate a device that outputs a sound signal and a microphone device that detects the intensity of a sound signal equal to or higher than a threshold value to one device group. The hub device 800, as illustrated in FIG. 9B, may designate the first speaker device 900-1 and the second microphone device 900-2 as a first device group 1120; designate the second speaker device 900-2, the third microphone device 900-3 and the seventh microphone device 900-7 as a second device group 1130; and designate the third speaker device 900-3, the fourth microphone device 900-4, the fifth microphone device 900-5 and the seventh microphone device 900-7 as a third device group 1140. In this case, the first speaker device 900-1 and the first microphone device 900-1 may be the same device, and the second speaker device 900-2 and the sixth microphone device 900-6 may be the same device.

The hub device 800 may designate a plurality of devices as one device group based on each room in the house. Accordingly, the hub device 800 may more efficiently control the devices in the house by receiving the user's voice in the device group in the space where the user is located.

The hub device 800 can receive a triggered voice for voice recognition using a microphone device capable of recognizing the triggered voice included in each device group. For example, the first microphone device 900-1 of the first device group, the sixth microphone device 900-6 of the second device group, and the fifth microphone device 900-5 of the third device group are used to recognize the triggered voice. The hub device 800 may determine to activate only one device group among a plurality of device groups based on the device in which the triggered voice is recognized. For example, when the triggered voice is recognized in the sixth microphone device 900-6, the hub device 800 may transmit a control command for activating the microphone to the microphone devices included in the second device group 1130.

The hub device 800 may perform user voice recognition based on the device group. When the user is located in the living room, the hub device 800 may acquire audio data corresponding to the user's voice from the microphone device included in the second device group 1130, and perform voice recognition using the obtained audio data. The hub device 800 may perform more accurate voice recognition by comparing the audio data obtained from the plurality of microphone devices and removing the noise. The hub device 800 may determine that a component having a common frequency among audio data obtained from a plurality of microphone devices is a user voice, and that the remaining components are noise.

Figure 12:
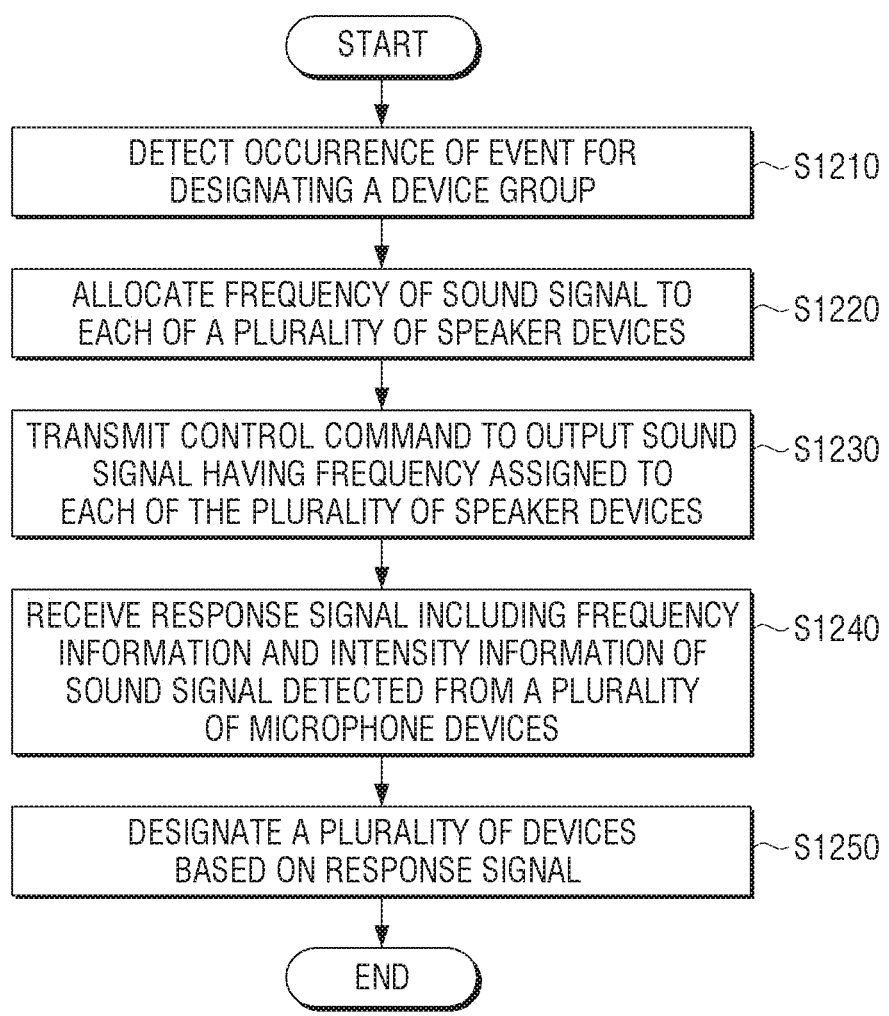
FIG. 12 is a flowchart of a method of designating a device group by a hub device according to an embodiment of the disclosure.

FIG. 12 is a flowchart of a method of designating a device group by a hub device according to an embodiment.

Referring to FIG. 12, the hub device 800 detects occurrence of an event for designating a device group at operation S1210.

The hub device 800 allocates the frequency of the sound signal to each of the plurality of speaker devices to designate a plurality of device groups at operation S 1220. The hub device 800 may assign not only the frequency of the sound signal but also the waveform, the output time, the output order, and the like.

The hub device 800 transmits a control command to output a sound signal having a frequency assigned to each of the plurality of speaker devices at operation S 1230. The hub device 800 may transmit a control command for activating the microphone to each of the plurality of microphone devices.

The hub device 800 receives an answer signal including frequency information and intensity information of a sound signal sensed by the plurality of microphone devices at operation S1240. The response signal may include information on the microphone device.

The hub device 800 designates a plurality of device groups based on the received response signal at operation S1250. The hub device 800 may designate a plurality of device groups based on the frequency information, the intensity information, and the information about the microphone device of the sound signal included in the response signal.

Figure 13:
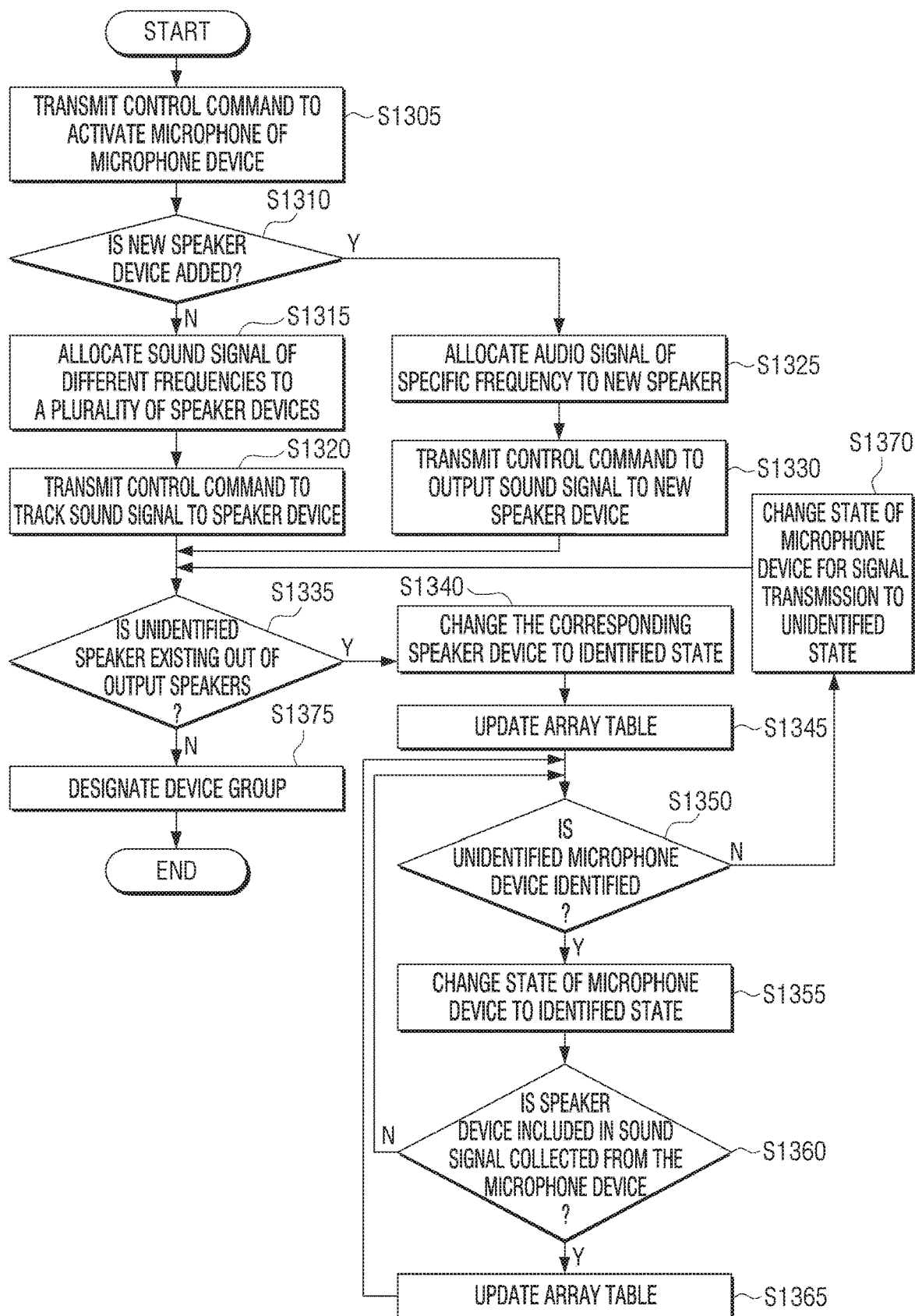
FIG. 13 is a flowchart of a detailed method of designating a device group by a hub device according to an embodiment of the disclosure.

FIG. 13 is a flowchart of a method of designating a device group by a hub device according to an embodiment of the disclosure.

Referring to FIG. 13, the hub device 800 may transmit a control command for activating a microphone of a microphone device to microphone devices at operation S1305.

The hub device 800 may determine that a new speaker device is added at operation S1310.

If no new speaker device is added at operation S1310-N, the hub device 800 may allocate a sound signal of a different frequency to a plurality of speaker devices at operation S1315, and transmit a control command at operation S1320.

If a new speaker device is added at operation S1310-Y, the hub device 800 may allocate a sound signal of a specific frequency to a new speaker device S1325 and transmit a new speaker device a control command for outputting a sound signal at operation S1330.

The hub device 800 may determine whether there is an unidentified speaker from among the speakers transmitting a control command at operation S1335.

If there is an unidentified speaker at operation S1335-Y, the hub device 800 changes the speaker device to the confirmed state at operation S1340 and may update the array table at operation S1345. The array table may be the table information on the speaker device and the microphone device for designating the device group, for example, the table shown on the right side of FIG. 11B. The hub device 800 confirms whether an unidentified microphone device exists at operation S1350. If there is an unidentified microphone device at operation S1350-Y, the hub device 800 changes the microphone device to the confirmed state at operation S1355.

The hub device 800 may determine whether or not the corresponding speaker device is included in the sound signal collected by the corresponding microphone device at operation S1360, and when the corresponding speaker device is included in the sound signal collected by the corresponding microphone device at operation S1360-Y, the hub device 800 may update the array table at operation S1365.

When a corresponding speaker device is not included in the sound signal collected by the corresponding microphone device at operation S1360-N, or a device table is updated, the hub device 800 may identify the unidentified microphone device again at operation S1350.

While repeating operations S1350 to S1365, when it is determined that there is no unidentified microphone device at operation S1350-N, the hub device 800 changes all the microphone devices transmitting the response signal to an unidentified state again at operation S1370.

The hub device 800 determines whether there is an unidentified speaker from among the output speaker at operation S1355, and if there is an unidentified speaker at operation S1335-Y, the hub device 800 may perform operations S1340 to S1370 again and if there is no unidentified speaker at operation S1335-N, the hub device 800 may designate a device group based on the response signal transmitted from the microphone signal at operation S1375.

Figure 14:
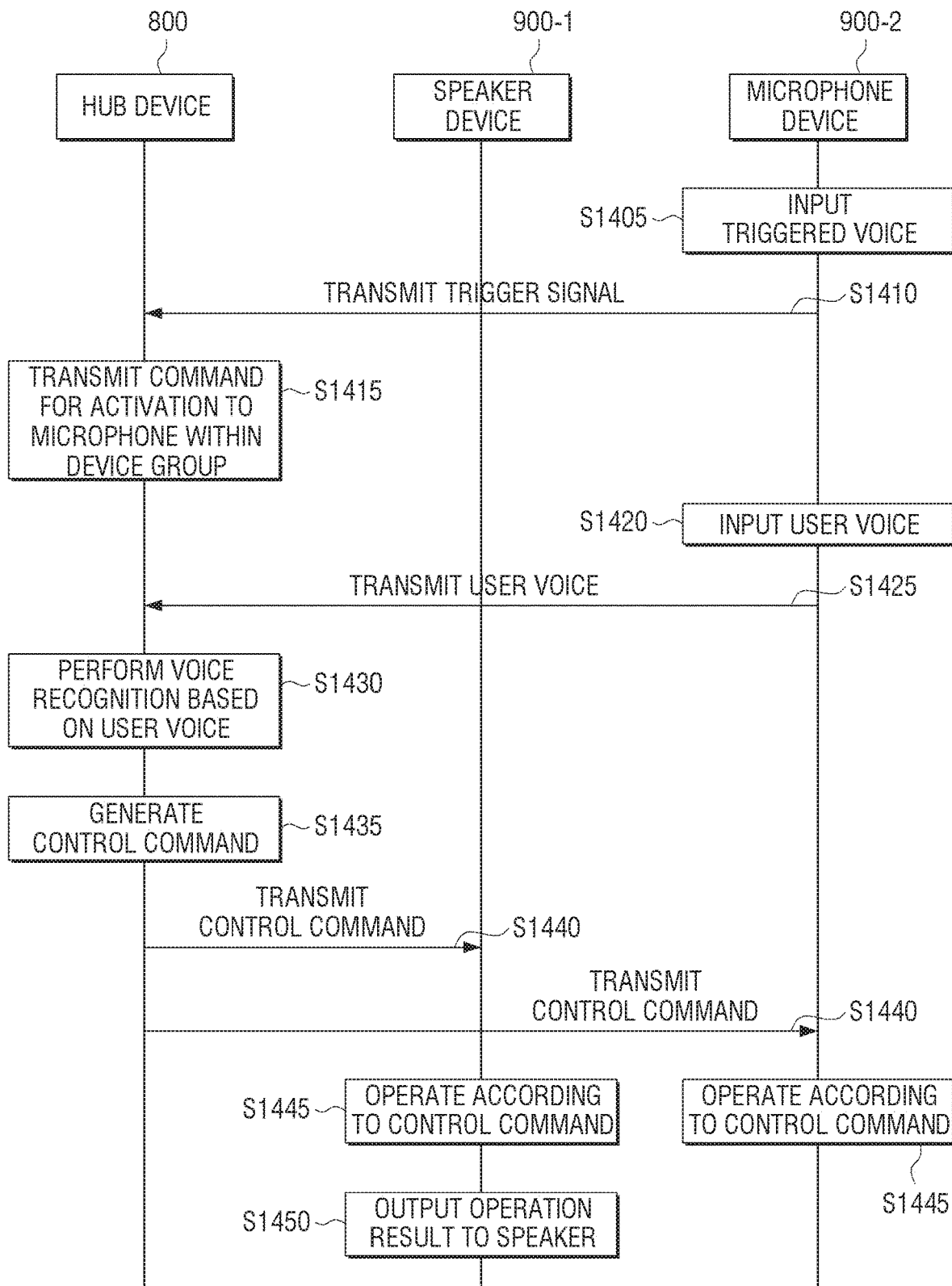
FIG. 14 is a sequence drawing to describe an embodiment of controlling a device group by a hub device according to an embodiment of the disclosure.

FIG. 14 is a sequence drawing of a method of controlling a device group by a hub device according to an embodiment of the disclosure.

Referring to FIG. 14, the microphone device 900-2 may receive a triggered voice for activating a voice recognition function at operation S1405. The microphone device 900-2 may be a device to provide a triggered voice recognition function which may receive a triggered voice even in a standby mode and provide a triggered voice recognition function.

The microphone device 900-2 may transmit a trigger signal to the hub device 800 at operation S1410. The trigger signal may be a signal to inform receiving of a trigger voice to the hub device 800.

The hub device 800 may transmit an activation command to a microphone device within a device group at operation S1415. The hub device 800 may transmit a microphone activation command to another microphone device within a device group in which the microphone device 900-2 belongs to.

The microphone device 900-2 may receive a user voice at operation S1420, and transmit the audio data regarding the user voice to the hub device 800 at operation S1425.

The hub device 800 may perform voice recognition based on the user voice received from the microphone device 900-2 at operation S1430. The hub device 800 may receive audio data corresponding to the user's voice from a plurality of microphone devices in the device group, compare the received audio data, and perform voice recognition after removing the noise. In addition, the hub device 800 may perform voice recognition using a pre-stored voice recognition model, but this is merely an example, and voice recognition can be performed using an external voice recognition server.

The hub device 800 can generate a control command based on the voice recognition result at operation S1435. The hub device 800 may generate the control command by inputting the voice recognition result into the pre-stored control command recognition model. The control command may also be generated using the external control command recognition server.

The hub device 800 may transmit the generated control command to the speaker device 900-1 and the microphone device 900-2 in the device group at operation S1440. At this time, the hub device 800 may transmit a control command to only one of the speaker device 900-1 and the microphone device 900-2 according to the control target device.

The speaker device 900-1 and the microphone device 900-2 may operate according to a control command at operation S1445.

The speaker device 900-1 may output the operation result to the speaker at operation S1450. The speaker device 900-1 may receive the operation result according to the control command from the hub device 800 and provide the same. The speaker device 900-1 may be a speaker device closest to the user or a speaker device that does not output content, but the disclosure is not limited thereto.

In the above-described embodiment, the hub device 800 located in the house has been described as designating a device group for the electronic devices in the house. However, this is merely an example, and a connected external server can designate a device group.

Figure 15:
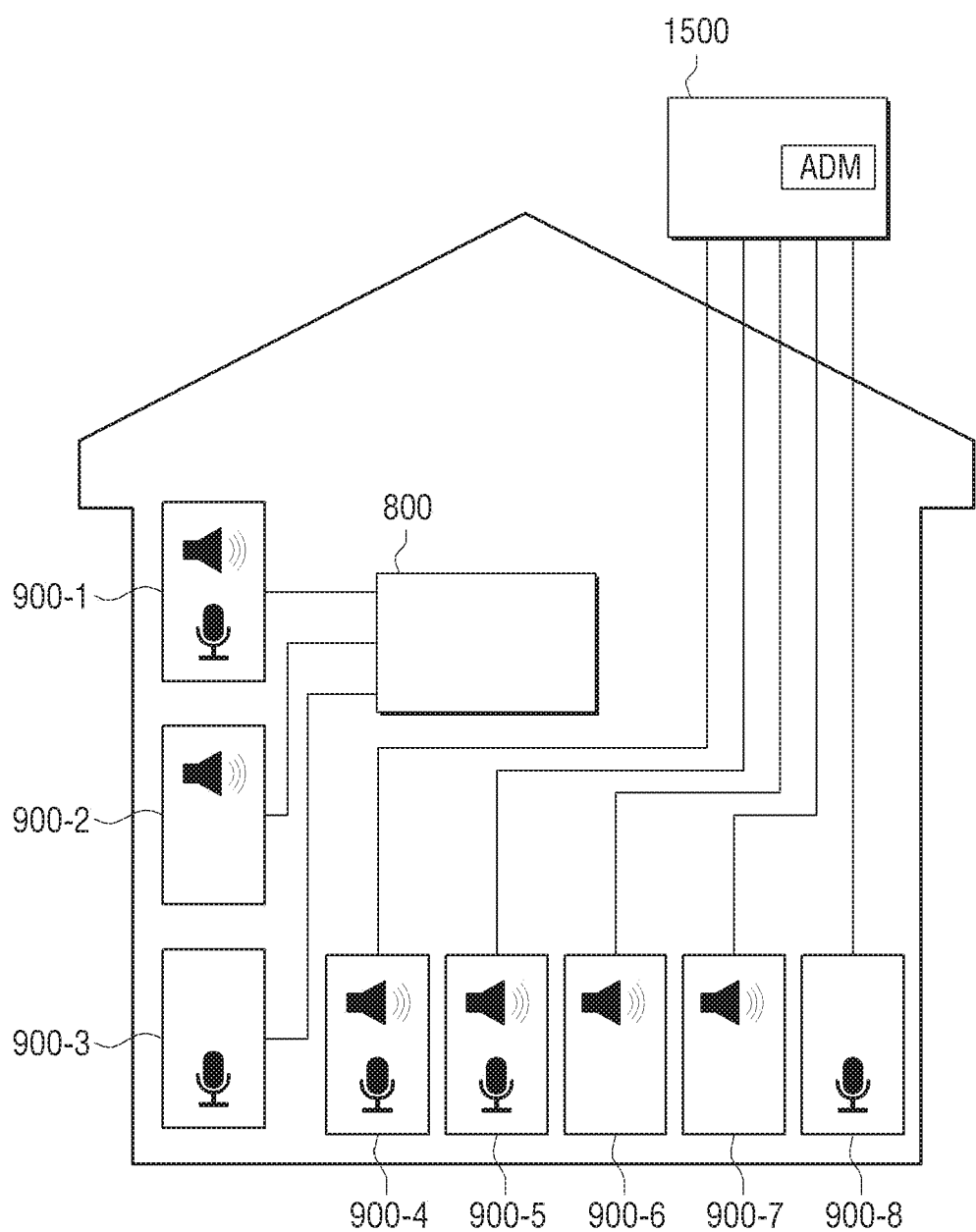
FIG. 15 is a drawing of a system including an external server for designating a device group according to an embodiment of the disclosure.

FIG. 15 is a drawing of a system including an external server for designating a device group according to an embodiment of the disclosure, Referring to FIG. 15, the server 1500 including the ADM module can designate a device group using the hub device 800 and the electronic devices 900-1 to 900-8 located in the house. That is, the operation of the hub device 800 as illustrated in FIGS. 8 to 14 is performed by an external server 1500 including the ADM module and the server 1500 and can designate a device group of the electronic devices 900-1 to 900-8 existing in the house and control the device group.

Figure 16:
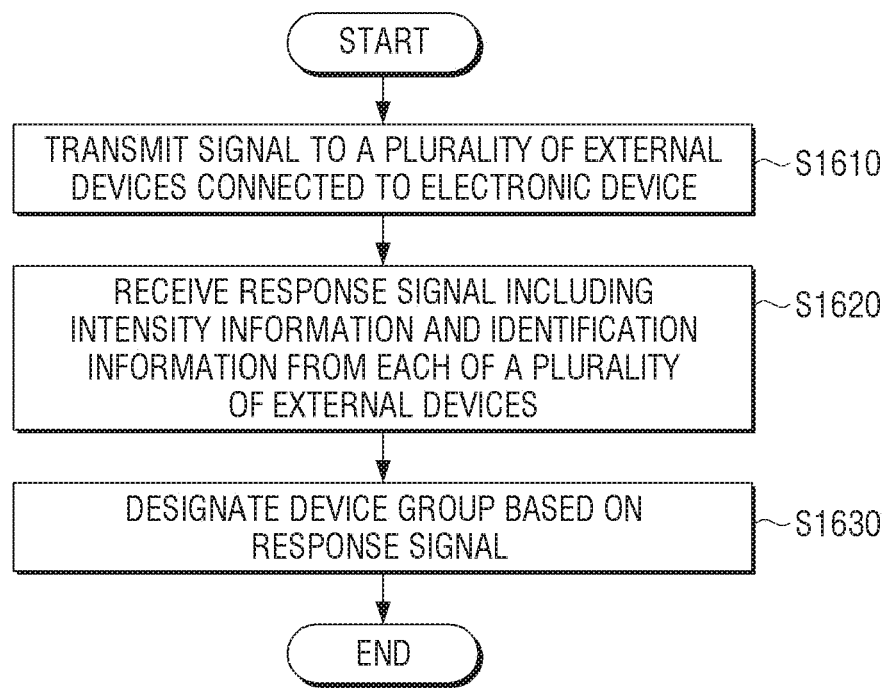
FIG. 16 is a flowchart of a method for designating a device group by an electronic device according to an embodiment of the disclosure.

FIG. 16 is a flowchart of a method for designating a device group by an electronic device according to an embodiment of the disclosure.

Referring to FIG. 16, the electronic device 100 transmits a signal to a plurality of external devices connected to the electronic device at operation S1610. The signal transmitted to the external device may be a sound signal which is output through a speaker.

The electronic device 100 receives a response signal including signal intensity information and identification information from each of the plurality of external devices at operation S1620. The response signal may include information on intensity of a sound signal and identification information of an external device.

The electronic device 100 designates a device group based on the response signal at operation S1630. The electronic device 100 may determine at least one external device among a plurality of external devices in the same space as the electronic device 100 based on the response signal, and designate the electronic device 100 and at least one external device as a designated as a device group. The electronic device 100 compares the intensity information of the sound signal included in the response signal with the threshold value, identifies the external device that received the sound signal having the intensity equal to or higher than the threshold value, and designates the identified external device and the device group.

By designating a device group based on a plurality of spaces by the aforementioned embodiment, a user may control devices within a house more efficiently.

In the above-described embodiment, it is described that the electronic device 100 or the hub device 800 designates a device group based on sound signal intensity information. However, the disclosure is not limited to this, and it is possible to designate a device group based on the intensity of a wireless communication signal (e.g., a Wi-Fi signal, a Bluetooth signal) other than the sound signal. The electronic device 100 may designate a device group by determining external devices located in the same space as the electronic device 100 based on the intensity of another wireless communication signal.

For example, the electronic device 100 may transmit a wireless communication signal via the communication interface 110 (e.g., a Wi-Fi module or a Bluetooth module). The external device 200 senses the intensity information of the wireless communication signal transmitted from the electronic device 100 and transmits a response signal including the intensity information and identification information of the sensed wireless communication signal to the electronic device 100. The electronic device 100 may designate a device group based on the intensity information and the identification information of the wireless communication signal included in the response signal.

Alternatively, the hub device 800 may transmit a control command to transmit a wireless communication signal to electronic devices in the house that have been identified, among the electronic devices in the house. The electronic devices whose position has been confirmed may transmit a wireless communication signal in accordance with a control command and other electronic devices sense intensity information of the wireless communication signal and generate a response signal including intensity information and identification information of the sensed wireless communication signal to the hub device 800. The hub device 800 can designate a device group based on the intensity information and the identification information of the wireless communication signal included in the response signal.

The hub device 800 may allocate a transmission order or a transmission time, rather than allocating a frequency to the electronic devices whose location has been confirmed, and the electronic devices of which position is confirmed according to the allocated transmission order or transmission time may transmit a wireless communication signal. The response signal may include information on a transmission order or a transmission time of the wireless communication signal, and the hub device 800 may identify the electronic devices that transmitted the wireless communication signal based on the information on the transmission order or the transmission time.

An embodiment in which the electronic device 100 or the hub device 800 controls a device group is described below.

Figure 17:
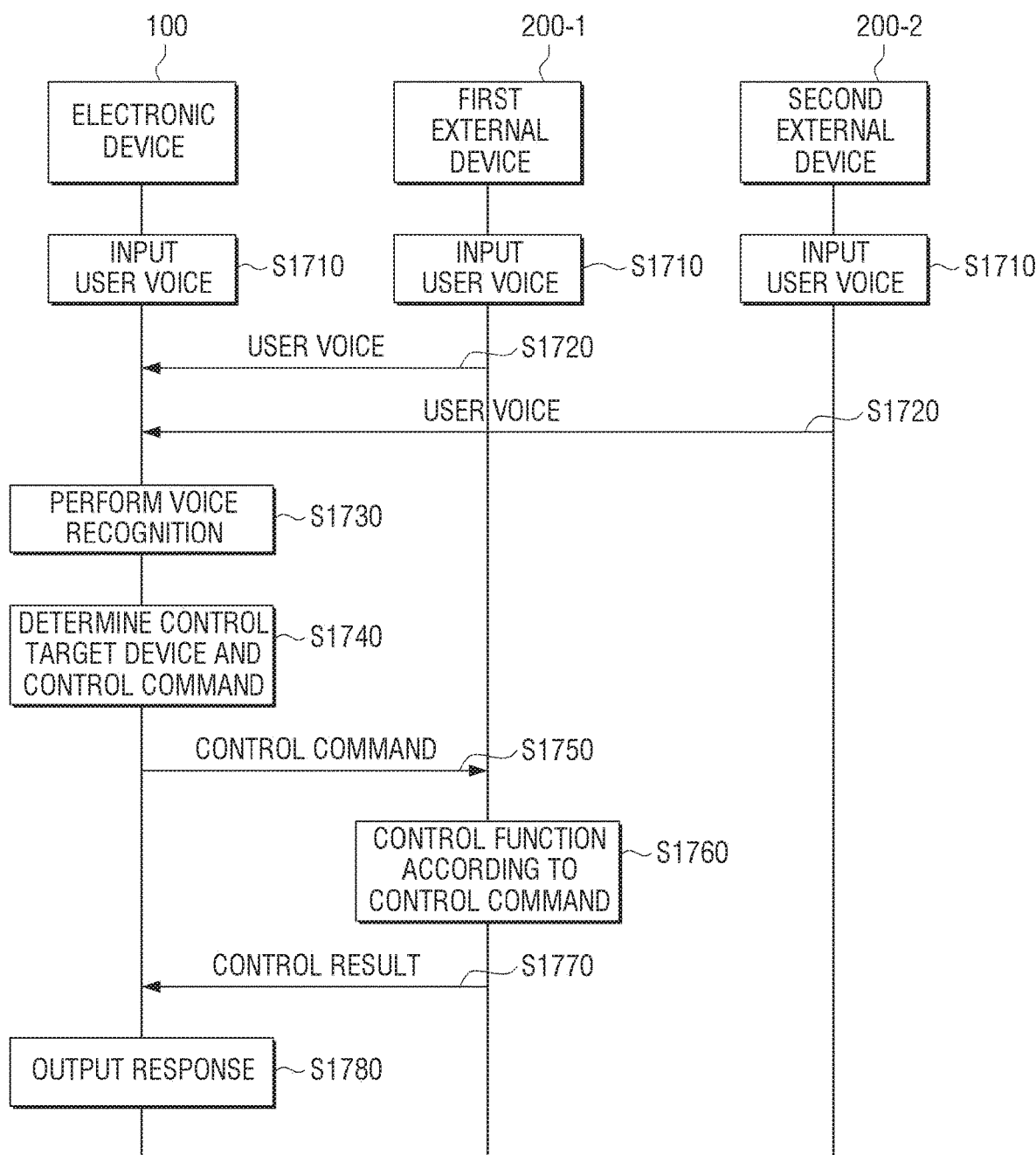
FIGS. 17, 18, and 19 are sequence drawings of an embodiment of controlling a device group by an electronic device or a hub device according to an embodiment of the disclosure.

FIG. 17 is a sequence drawing of a method of controlling a device group by an electronic device or a hub device according to an embodiment of the disclosure. The electronic device 100, the first external device 200-1 and the second external device 200-2 may be one device group.

Referring to FIG. 17, the electronic device 100, the first external device 200-1, and the second external device 200-2 can receive a user voice at operation S1710. When the user speaks, the electronic device 100, the first external device 200-1, and the second external device 200-2 belonging to the device group in the same space may receive the user's voice simultaneously.

The first external device 200-1 and the second external device 200-2 may transmit data regarding the user's voice to the electronic device 100 at operation S1720.

The electronic device 100 may perform voice recognition based on data regarding the user's voice input by the electronic device 100 and data on the user's voice received from the first external device 200-1 and the second external device 200-2 at operation S1730. More accurate voice recognition may be performed by removing noise using a plurality of data for the same user voice.

The electronic device 100 may determine the control target device and the control command based on the voice recognition result at operation S1740. The electronic device 100 may determine the control target device and the control command by analyzing the user's voice through natural language processing. For example, when the electronic device recognizes the words "TV volume down", the electronic device 100 may determine a control command "Volume down" and a control target device called "TV". When the first external device 200-1 is a TV, the electronic device 100 can determine the first external device 200-1 as a control target device.

The electronic device 100 may transmit a control command to the first external device 200-1 which is determined as a control target device at operation S1750.

The first external device 200-1 may control a function according to a received control command at operation S1760. For example, the first external device 200-1 may reduce volume according to a control command.

The first external device 200-1 may transmit a control result to the electronic device 100 at operation S1770.

The electronic device 100 may output a response to the user's voice based on the control result received from the first external device 200-1 (S1780). For example, electronic device 100 may output the response "TV volume is reduced to 5".

In the above-described embodiment, the control target device is determined as one device, but this is only an embodiment, and the control target device can be determined as all devices in the device group. For example, when the user's voice of "I will sleep and turn everything off" is recognized, the electronic device 100 determines all the devices in the device group as control target devices and can transmit a control command "Turn off". All devices in the device group can transmit the control result to the electronic device 100, and then perform a "Turn off" operation according to the control command.

Figure 18:
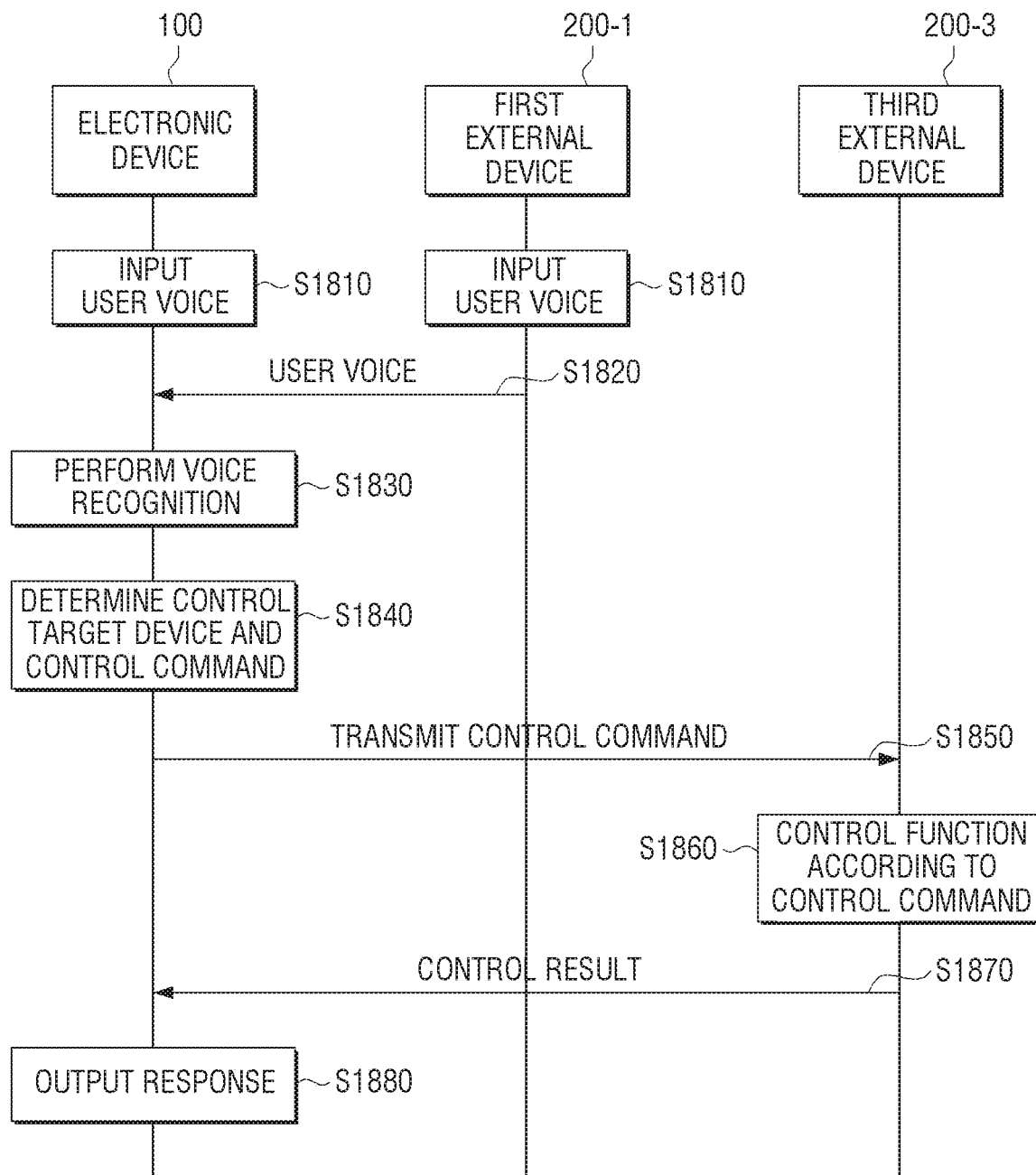

FIG. 18 is a sequence drawing of a method of controlling a device group by an electronic device according to an embodiment of the disclosure.

Referring to FIG. 18, the electronic device 100 and the first external device 200-1 may receive a user's voice at operation S1810. When the user speaks, the electronic device 100 and the first external device 200-1 belonging to the same device group may receive the user's voice at the same time, and the third external device 200-3 may not be able to receive the user's voice or may receive the user's voice with an intensity that is less than or equal to a predetermined value.

The first external device 200-1 may transmit data on the user's voice to the electronic device 100 at operation S1820.

The electronic device 100 may perform voice recognition based on data regarding a user's voice which the electronic device 100 receives and user's voice received from the first external device 200-1 at operation S1830.

The electronic device 100 can determine the control target device and the control command based on the voice recognition result at operation S1840. The electronic device 100 may determine the control target device and the control command by analyzing the user's voice through natural language processing. For example, when the electronic device 100 recognizes the words "TV volume down", the electronic device 100 may determine a control command "Volume down" and a control target device called "TV". When the TV is not present in the device group included in the electronic device 100 and the first external device 200-1, or the TV in the device group is already turned off, the electronic device 100 controls the TV of another device group as the target device. For example, when the third external device 200-3 is a TV of another device group, the electronic device 100 may determine the third external device 200-3 as the control target device. The electronic device 100 may directly determine the device to be controlled; but this is only an example, and the control target device can be determined through the hub device 800.

The electronic device 100 may transmit a control command to the third external device 200-3 determined as the control target device at operation S1850. When the communication between the electronic device 100 and the third external device 200-3 is not directly connected, the electronic device 100 may transmit a control command to the third external device 200-3 through the hub device 800.

The third external device 200-3 may control a function according to the received control command at operation S1860. For example, the third external device 200-3 may reduce volume according to a control command.

The third external device 200-3 may transmit a control result to the electronic device 100 at operation S1870. In this case, the third external device 200-3 may transmit a control result to the electronic device 100 through the hub device 800.

The electronic device 100 may output a response to the user's voice based on the control result received from the third external device 200-3 at operation S1880. For example, the electronic device 100 may output a response "the volume of the TV in the living room is reduced to 5".

The electronic device 100 described in FIGS. 17 and 18 may be realized as the hub device 800 and the external device 200 may be implemented as a microphone device and a speaker device including at least one of a microphone and a speaker.

Figure 19:
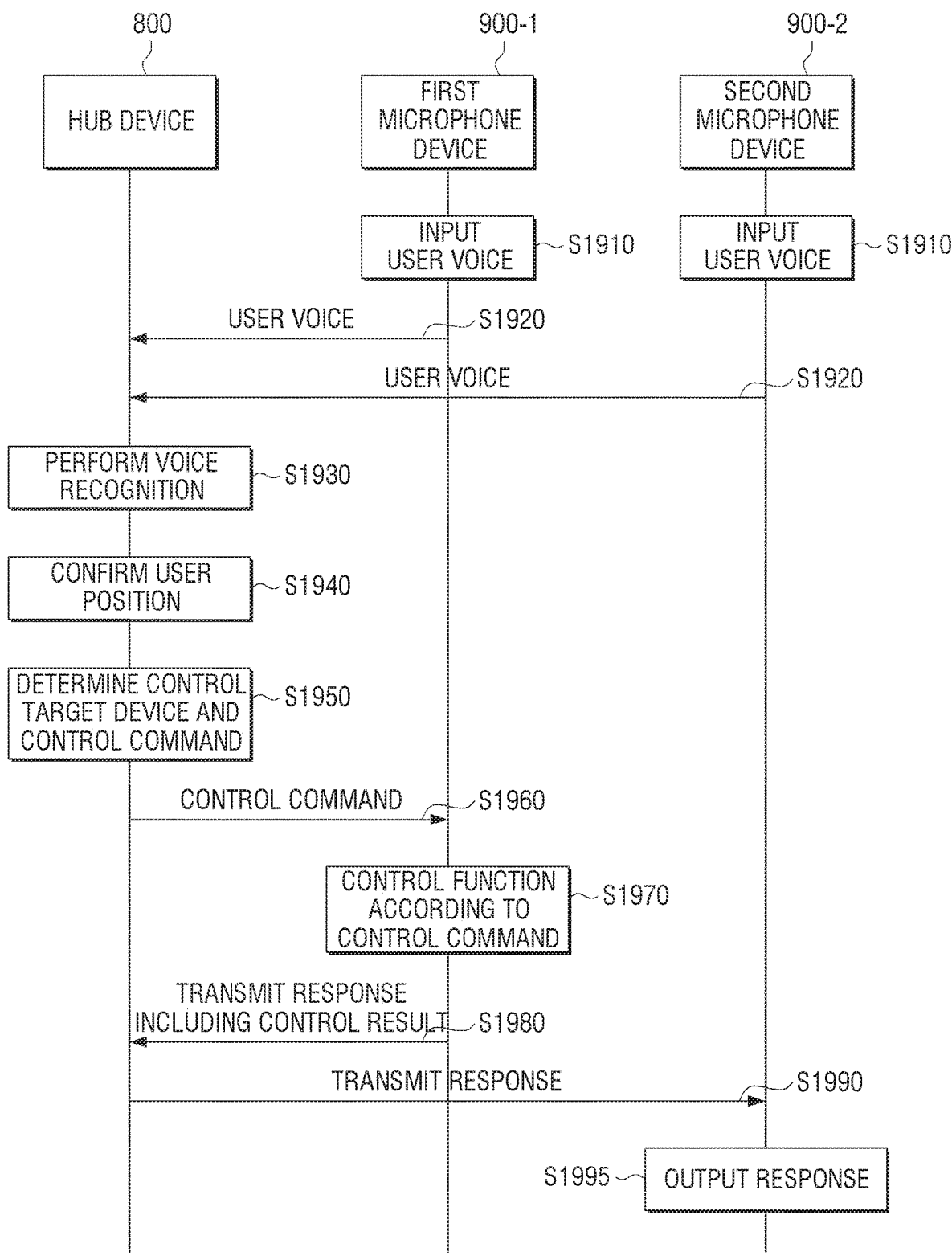

FIG. 19 is a sequence drawing of a method of controlling a device group by an electronic device or a hub device according to an embodiment of the disclosure. The first and the second microphone devices 900-1 and 900-2 can be one device group.

Referring to FIG. 19, the first microphone device 900-1 and the second microphone device 900-2 may receive a user's voice at operation S1910. When the user speaks, the first microphone device 900-1 and the second microphone device 900-2 belonging to the device group in the same space may simultaneously (or substantially simultaneously) receive the user's voice.

The first microphone device 900-1 and the second microphone device 900-2 may transmit data on a user's voice to the hub device 800 at operation S1920.

The hub device 800 may perform voice recognition based on data regarding user's voice received from the first microphone device 900-1 and the second microphone device 900-2 at operation S1930.

The hub device 800 may confirm the user position based on the information about the first microphone device 900-1 and the second microphone device 900-2 at operation S1940). For example, when the first microphone device 900-1 is a robot cleaner and the second microphone device 900-2 is a refrigerator, the hub device 800 may confirm that the user's position is a kitchen.

The hub device 800 may determine the control target device and the control command based on the voice recognition result at operation S1950. The hub device 800 may determine the control object information and the control command based on the user location information. For example, when a user command of "clean that place" is inputted, the hub device 800 determines a robot cleaner as a control target device and can determine a control command "clean a living room adjacent to a kitchen". As another example, when the user command "turn off the light" is inputted, the hub device 800 can determine the lamp in the kitchen as the control target device and determine the control command "turn off" as the control command.

The hub device 800 may transmit a control command to the first microphone device 900-1 which is determined as a control target device at operation S1960.

The first microphone device 900-1 may control the function according to the received control command at operation S1970. For example, when the first microphone device 900-1 is a robot cleaner, the first microphone device 900-1 may move to a living room according to a control command to perform a cleaning operation.

The first microphone device 900-1 can transmit the control result to the hub device 800 at operation S1980. The hub device 800 may transmit the control result to the second microphone device 900-2 including an output device such as a speaker or a display at operation S1990.

The second microphone device 900-2 may output a response to a user's voice based on the received control result at operation S1995. For example, the second microphone device 900-2 may output a response "a robot cleaner started cleaning operation for a living room."

Various embodiments of the present document may be implemented as software, including commands stored on storage media readable by a machine such as a computer. The machine is a device which can call a command stored in the storage medium and is operable according to the called command, and include an electronic device. When the command is executed by a processor, the processor may perform a function corresponding to the command using other components under the control of the processor. The command may include a code which is generated or executed by a compiler or interpreter. The machine-readable storage medium can be provided as a format of a non-transitory storage medium. "Non-transitory" means that the storage medium does not include a signal and is tangible, but it does not distinguish whether the data is stored semi-permanently or temporarily on the storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of online distribution, at least a portion of the computer program product may be stored temporarily or at least transitorily in a storage medium such as a manufacturer's server, a server of an application store, or a memory of a relay server.

Each of the components (e.g., a module or a program) according to various embodiments may be composed of a single entity or a plurality of entities, and some subcomponents of the abovementioned subcomponents may be omitted, or other sub-components may be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed in a sequential, parallel, iterative, or heuristic manner, or at least some operations may be performed in a different order, omitted, or other operations can be added.

The non-transitory computer readable medium refers to a medium that stores data semi-permanently, and is readable by an apparatus. The above-described various applications or programs may be stored in the non-transitory computer readable medium such as a compact disc (CD), a digital versatile disc (DVD), a hard disk, a Blu-ray disk, a universal serial bus (USB), a memory card, a ROM or etc., and may be provided.

The foregoing embodiments and advantages are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A controlling method of an electronic device, the method comprising:
   transmitting a sound signal to a plurality of external devices communicatively connected to the electronic device;
   receiving, from each of the plurality of external devices, a response signal corresponding to the sound signal, the response signal comprising intensity information regarding intensity of the sound signal sensed by an external device and identification information of the external device;
   identifying at least one external device that is positioned in a same space as the electronic device, from among the plurality of external devices, based on the response signal;
   identifying a device group including the at least one external device and the electronic device; and
   controlling at least one device included in the device group based on a user command being received through at least one device included in the device group.

2. The method as claimed in claim 1, wherein the identifying comprises:
   identifying the at least one external device, from among the plurality of external devices, of which intensity information of the sound signal included in the response signal is greater than or equal to a predetermined value; and
   designating the at least one identified external device as the device group along with the electronic device.

3. The method according to claim 1,
   wherein the electronic device comprises a speaker, and each of the plurality of external devices comprises a microphone,
   wherein the sound signal is output from the speaker, and wherein the response signal comprises intensity information of the sound signal received from the microphone provided in each of the plurality of external devices.

4. The method according to claim 3,
   wherein the sound signal has a specific pattern to identify the electronic device, and
   wherein the response signal comprises information on a frequency of the specific pattern.

5. The method according to claim 3, further comprising:
   when one of the devices included in the device group receives a triggered voice to perform a voice recognition function, transmitting a trigger signal to activate a microphone to each of the devices included in the device group.

6. The method according to claim 3, wherein the controlling of the at least one device further comprises:
   after the device group is designated, when a user's voice is input through a microphone included in the at least one external device, receiving, from the at least one external device, information on the user's voice; and
   performing voice recognition using information on the user's voice received from the at least one external device.

7. The method according to claim 6, wherein the controlling of the at least one device further comprises:
   determining a control target device from among devices included in the device group based on a result of the voice recognition; and
   transmitting, to the determined control target device, a control command corresponding to the voice recognition result.

8. The method according to claim 6, wherein the controlling of the at least one device further comprises:
   when the user's voice is determined as a command for controlling all the devices included in the device group, transmitting a control command to all the devices included in the device group.

9. The method according to claim 6, wherein the controlling of the at least one device further comprises, when a control target device is not included from among the devices included in the device group, transmitting a signal requesting confirmation of the control target device to an external device.

10. The method according to claim 6, wherein the controlling of the at least one device further comprises:
    identifying position information of a user who utters the user's voice based on information on the devices included in the device group and information on the user's voice received from the at least one external device.

11. An electronic device, comprising:
    a communication interface configured to communicate with an external device; and
    at least one processor configured to:
    transmit a sound signal to a plurality of external devices communicatively connected to the electronic device,
    receive, from each of the plurality of external devices, a response signal corresponding to the sound signal, the response signal comprising intensity information regarding intensity of the sound signal sensed by an external device and identification information of the external device,
    identify at least one external device that is positioned in a same space as the electronic device, from among the plurality of external devices, based on the response signal, identify a device group including the at least one external device and the electronic device, and generate a control signal to control at least one device included in the device group based on a user command being received through at least one device included in the device group.

12. The electronic device according to claim 11, wherein the at least one processor is further configured to:

identify the at least one external device, from among the plurality of external devices, of which intensity information of the sound signal included in the response signal is greater than or equal to a predetermined value, and designate the at least one identified external device as the device group along with the electronic device.

13. The electronic device according to claim 11, wherein the electronic device further comprises a speaker for outputting audio, wherein the sound signal is output from the speaker, and wherein the response signal comprises intensity information of the sound signal received from a microphone provided in each of the plurality of external devices.

14. The electronic device according to claim 13, wherein the sound signal has a specific pattern to identify the electronic device, and the response signal comprises information on a frequency of the specific pattern.

15. The electronic device according to claim 13, wherein the at least one processor is further configured to, when one of the devices included in the device group receives a triggered voice to perform a voice recognition function, control the communication interface to transmit a trigger signal to activate a microphone to each of the devices included in the device group.

16. The electronic device according to claim 13, wherein the at least one processor is further configured to, after the device group is designated:

when a user's voice is input through a microphone included in the at least one external device, receive, from the at least one external device, information on a user's voice, and perform voice recognition using information on the user's voice received from the at least one external device.

17. The electronic device according to claim 16, wherein the at least one processor is further configured to:

determine a control target device from among devices included in the device group based on a result of the voice recognition, and control the communication interface to transmit, to the determined control target device, a control command corresponding to the voice recognition result.

18. The electronic device according to claim 16, wherein the at least one processor is further configured to, when the user's voice is determined as a command for controlling all the devices included in the device group, control the communication interface to transmit a control command to all the devices included in the device group.

19. The electronic device according to claim 16, wherein the at least one processor is further configured to, when a control target device is not included from among the devices included in the device group, control the communication interface to transmit a signal requesting confirmation of the control target device to an external device.

20. The electronic device according to claim 16, further comprising:

a memory configured to store information on devices included in the device group, wherein the at least one processor is further configured to identify position information of a user who utters the user's voice based on information on the devices included in the device group and information on the user's voice received from the at least one external device.

* * * * *